(12) United States Patent
Kimelman et al.

(10) Patent No.: US 7,962,891 B2
(45) Date of Patent: Jun. 14, 2011

(54) AUTOMATED METHOD FOR STRUCTURED ARTIFACT MATCHING

(75) Inventors: Douglas Neil Kimelman, Winnipeg (CA); Marsha Kimelman, Winnipeg, CA (US); David Peter Mandelin, Berkeley, CA (US); Daniel M. Yellin, Gimmel, IL (US)

(73) Assignee: International Business Machines Corporation, Armonk, NY (US)

( * ) Notice: Subject to any disclaimer, the term of this patent is extended or adjusted under 35 U.S.C. 154(b) by 1096 days.

(21) Appl. No.: 11/735,427

(22) Filed: Apr. 13, 2007

(65) Prior Publication Data

US 2008/0256038 A1    Oct. 16, 2008

(51) Int. Cl.
    *G06F 9/44* (2006.01)
(52) U.S. Cl. ......................... 717/104; 717/100
(58) Field of Classification Search .................. 717/100, 717/104, 105
    See application file for complete search history.

(56) References Cited

U.S. PATENT DOCUMENTS

| | | | | |
|---|---|---|---|---|
| 6,408,311 | B1 * | 6/2002 | Baisley et al. | 1/1 |
| 6,701,016 | B1 * | 3/2004 | Jojic et al. | 382/209 |
| 6,711,734 | B1 * | 3/2004 | Baisley | 717/104 |
| 7,636,894 | B2 * | 12/2009 | Vedula et al. | 715/763 |
| 7,676,756 | B2 * | 3/2010 | Vedula et al. | 715/763 |
| 7,739,655 | B1 * | 6/2010 | Monteiro et al. | 717/105 |
| 2004/0083199 | A1 * | 4/2004 | Govindugari et al. | 707/1 |
| 2005/0273763 | A1 * | 12/2005 | Bendsen et al. | 717/120 |
| 2008/0172209 | A1 * | 7/2008 | Heckerman et al. | 703/2 |

OTHER PUBLICATIONS

Madhavan et al., "Generic Schema Matching with Cupid," Aug. 2001, Microsoft.*
Melnik et al., "Similarity Flooding: A Versatile Graph Matching Algorithm and its Application to Schema Matching," 2002, International Conference on Data Engineering (ICDE), p. 1-12.*
David Mandelin, Doug Kimelman, and David Yellin, "A Bayesian Approach to Diagram Matching with Application to Architectural Models," ICSE, 2006.

* cited by examiner

*Primary Examiner* — Anna Deng
*Assistant Examiner* — Qing Chen
(74) *Attorney, Agent, or Firm* — Michael J. Buchenhorner; Vazken Alexanian

(57) ABSTRACT

A method for determining a mapping between a first artifact and a second artifact, each artifact comprising at least one constituent, each at least one constituent comprising at least one feature, wherein each at least one feature is selected from a feature group consisting of: a relationship feature and a characteristic feature, the mapping comprising at least one constituent match comprising a correspondence between the at least one constituent of the first artifact and the at least one constituent of the second artifact, the method includes acts or steps of: a) receiving as input the first and second artifacts, and a description of the artifacts, constituents, and the features of the constituents; b) performing advanced inexact matching, comprising a step of selecting the mapping, the mapping comprising the at least one constituent match; and c) producing as output the mapping determined from the step of performing advanced inexact matching.

18 Claims, 12 Drawing Sheets

Determine a mapping.

Figure 1. Determine a mapping.

Figure 2. Search for mapping.

Figure 3. Try current pair.

Figure 4. Evaluate mapping.

Figure 5. Get overall probability of a pair match.

Figure 6. Get overall probability of a split/merge match.

Figure 7. Use simple evidencers to update prod1 and prod0 for a split/merge match Figure 8. Use split/merge evidencers to update prod1 and prod0

Figure 9. Training a discrete evidencer

Figure 10. Training a continuous evidencer

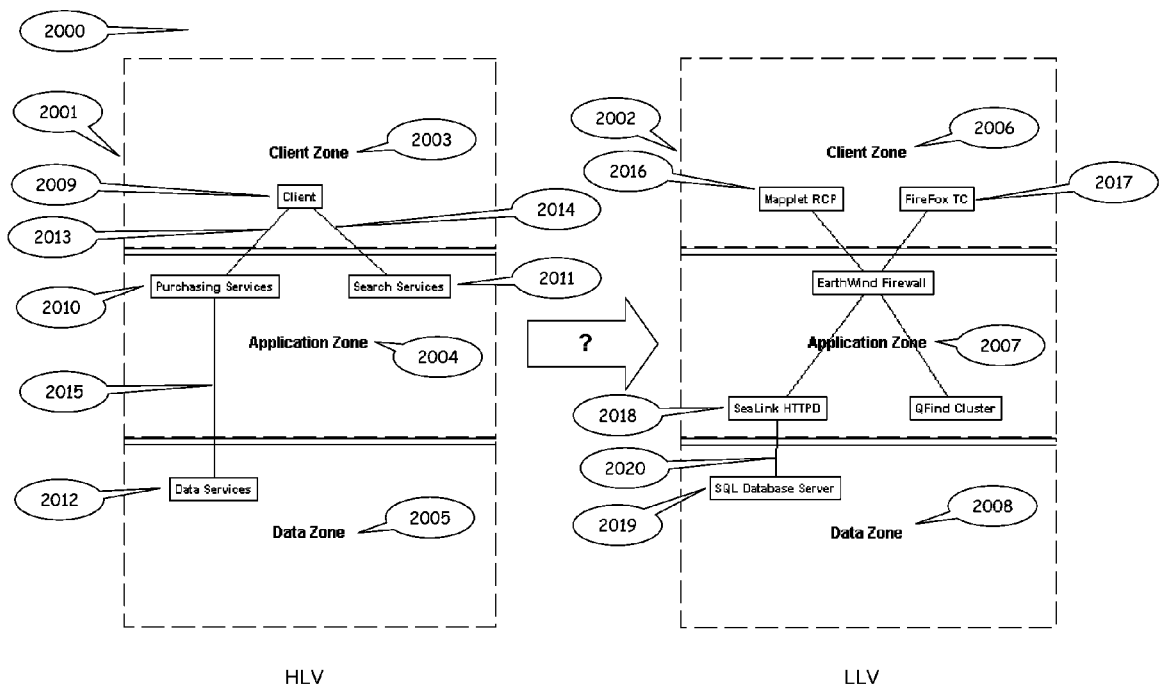
Figure 12 Example diagram pair.

AUTOMATED METHOD FOR STRUCTURED ARTIFACT MATCHING

CROSS-REFERENCE TO RELATED APPLICATIONS

Not applicable.

STATEMENT REGARDING FEDERALLY SPONSORED-RESEARCH OR DEVELOPMENT

Not applicable.

INCORPORATION BY REFERENCE OF MATERIAL SUBMITTED ON A COMPACT DISC

Not Applicable.

BACKGROUND OF THE INVENTION

1. Field of the Invention

The present invention generally relates to managing structured artifacts, and more particularly to determining matches between a pair of structured artifacts.

2. Description of the Related Art

System architectures are often described by formal models or informal diagrams. In practice, there are often a number of versions of a model, e.g. for different views of a system, divergent variants, or a series of revisions. This is especially true for Information Technology (IT) system architectures. Understanding how versions of an IT model correspond or differ is crucial, yet model correspondence remains a mostly manual process, subject to errors and altogether too time-consuming. Little work has been done on automated assistance for matching models and diagrams.

Finding correspondences between diagrams and models has several applications in the system development lifecycle. There are many examples of diagrams and models central to the modern IT systems development processes. Some of these include: structured representations of requirements, system overviews, architectural specifications of systems, network topologies, object designs, state transition diagrams, and control and data flow representations of code.

Finding correspondences also has application for many other kinds of structured artifacts, including: network topologies, business models, process workflow diagrams, structured representations of requirements, organization charts, entity-relationship diagrams, state transition diagrams, object designs, control and data flow representations of program code, dataflow graphs, user-interface designs, general presentation diagrams, etc.

The necessity for finding correspondences between diagrams and models can be summed up with three primary scenarios: a) reviewing and understanding revisions; b) understanding divergent variants for integration; and c) contributing to recovery of traceability information.

Reviewing and understanding revisions. An essential part of quality assurance in any engineering discipline is control of change. That dictates the need to review and understand changes prior to accepting them. In environments where models and diagrams are a primary design artifact, this means being able to compare a baseline diagram with a revised diagram to identify correspondences and discrepancies between them.

Understanding divergent variants for integration. Comparison is also necessary when integrating divergent variants of a model.

Contributing to recovery of traceability information. Furthermore, finding correspondences can be an important part of recovering traceability information that was not recorded during original development. One possible cause of not recording such information is deadline pressure. Traceability between software artifacts is the ability to navigate between related artifacts, such as requirements, architecture designs, models, code, test cases, and defect reports. At a finer level of granularity, it provides the ability to navigate between the elements included in different artifacts (e.g., between individual software components, hardware nodes, requirements, non-functional requirements, architectural decisions, and so forth, in an Architectural Description Standard design). Traceability is considered an important ingredient in improving the efficiency and quality of software production, and is used throughout the software development lifecycle. For example, it can be used by project managers to verify that each requirement has been satisfied, by architects to check the correct implementation of design concerns, and by software code maintainers to access the impact of a change.

The three primary scenarios discussed to this point are: a) reviewing and understanding revisions; b) understanding divergent variants for integration; and c) contributing to recovery of traceability information. Additional scenarios include: d) maintaining consistency between views; and e) identifying use of reference architectures.

Maintaining consistency between views. In model-driven development, different aspects of the system are represented by different sub-models. For example, one model may represent a functional view of the system, omitting non-functional requirements such as performance, while another model may represent an operational view, including non-functional requirements. Alternatively, one diagram may show elements of the system pertaining to security, while another diagram may show elements pertaining to high availability.

The different models may be created at different times and by different authors, which can render them inconsistent. Also, sometimes a designer changes one model but neglects to change the others. This is a problem for model-driven development, where diagrams must be consistent. Maintaining or restoring consistency requires an accurate understanding of the correspondences between diagrams. Maintaining consistency between overlapping views of a system is a vexing problem in the daily work of information technology (IT) architecture practitioners. Tool support for maintaining consistency will have a significant impact on productivity and quality.

Identifying use of reference architectures. Given a repository of architectural design documents, a user may want to find reference documents similar to the user's own design. Also, reference architectures change, so architects must be able to find and update customized uses of reference architectures within solutions. Finally, architects may need to find where a portion of a reference architecture has been used across a portfolio of solutions, or to determine which portions of a reference architecture have been used in a given solution.

Although human experts are capable of using reasoning in making good determinations of correspondences between models, it is a tedious, error-prone, time-consuming, manual process. While techniques have long existed for automated comparison of textual artifacts, little work has been reported concerning automated comparison of structured artifacts such as the diagrams and models that are common in large-scale IT system development. Therefore, there is a need for a method to overcome the stated shortcomings of the prior art.

SUMMARY OF THE INVENTION

Briefly, according to an embodiment of the present invention, a method for determining a mapping between a first artifact and a second artifact, each artifact comprising at least one constituent, each at least one constituent comprising at least one feature, wherein each at least one feature is selected from a feature group consisting of: a relationship feature and a characteristic feature, the mapping comprising at least one constituent match comprising a correspondence between the at least one constituent of the first artifact and the at least one constituent of the second artifact, the method includes acts or steps of: a) receiving as input the first and second artifacts, and a description of the artifacts, constituents, and the features of the constituents; b) performing advanced inexact matching, comprising a step of selecting the mapping, the mapping comprising the at least one constituent match; and c) producing as output the mapping determined from the step of performing advanced inexact matching.

The method may be advantageously performed when the at least one constituent match includes a correspondence between one constituent from the first artifact and more than one constituent from the second artifact.

A system for determining a mapping between a first artifact and a second artifact includes: an input/output interface configured for receiving input data and transmitting as output the mapping; data storage configured for storing the first and second artifacts, and a description of the artifacts, each artifact comprising at least one constituent, each at least one constituent comprising at least one feature; and a processor, operatively connected to a memory, the memory comprising logic, the processor configured to perform according to the logic, the logic comprising instructions according to the method steps discussed above.

A signal bearing medium includes instructions for determining correspondences between artifacts, the instructions enabling the medium to perform the method steps as stated above.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 12 illustrates an example diagram pair showing a high level view and a low level view.

DETAILED DESCRIPTION OF PREFERRED EMBODIMENTS

Figure 1:
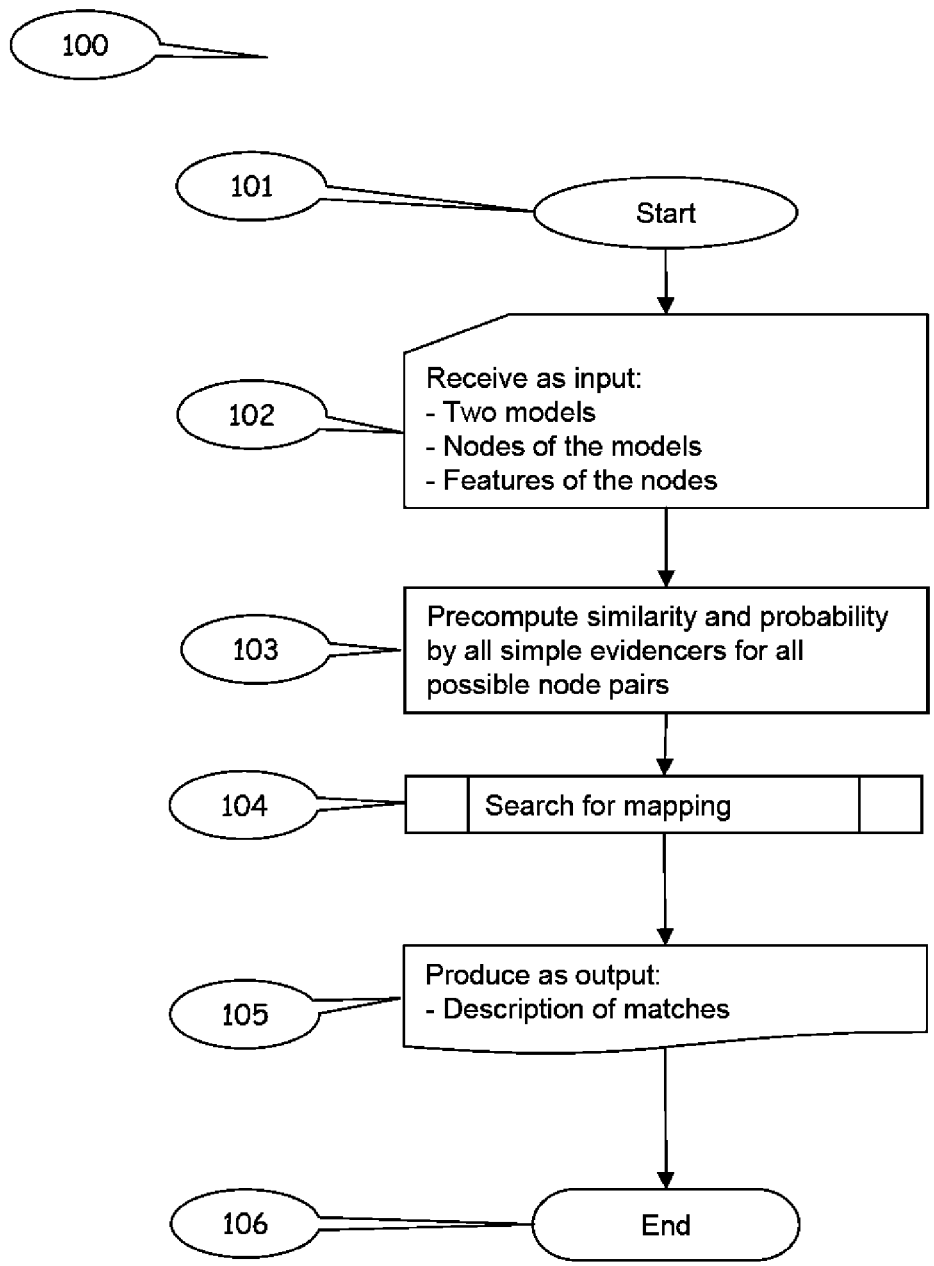
FIG. 1 is a flowchart of the matching algorithm for performing structured artifact matching, according to an embodiment of the present invention.

Definitions of Terms—Following are Some Terms Used Throughout this Application:

Bayes Theorem—a mathematical formula for calculating conditional probabilities by relating the conditional probability distributions of random variables. The probability of an event A conditional on another event B is generally different from the probability of B conditional on A; however, there exists a relationship between the two, and Bayes theorem is the statement of that relationship. Bayes theorem also teaches a posteriori probability calculations (updating or revising probabilities in light of new evidence).

Artifact—an object made, used, or modified by humans.

Bayesian Model—a model based on Bayes Theorem.

Candidate correspondence—a correspondence that is a candidate for being considered a match.

Constituent—a component of an artifact;

Containers—a container is simply a node that contains other nodes.

Continuous evidencers—evidencers, such as label, position, and connection, which return continuous similarity measures and have continuous distributions.

Correspondences—a general indication of a relationship between objects, as in "A corresponds to B."

D and D'—two diagrams used for comparison.

Discrete evidencers—evidencers, such as region and type, which return discrete similarity measures.

Edge—an edge represents a relationship or association. An edge can be labeled, and it links two or more nodes. In operational models, edges indicate communication paths that connect nodes.

Edge correspondence—measured as the as the fraction of edges touching n that have corresponding edges touching n', and vice versa.

Evidencer—the combination of a feature definition, a similarity measure, and a probability distribution on similarity; it provides all the information needed to process one kind of evidence.

Feature similarity—a similarity between relevant node features, such as labels.

Graph isomorphism—the problem of testing whether two graphs have the same structure.

Greedy search—a search that progresses from one point to the next, taking the locally optimal route at each step.

Groups—a set of nodes. A node may belong to multiple groups but can be in only one container IT operational modeling—Modeling application, infrastructure and deployment aspects of information systems.

Labeled nodes—nodes with labels attached to them.

Label similarity—the similarity between text labels of a node pair.

Local connection similarity—measures the degree to which two nodes connect to corresponding nodes as the fraction of edges touching n that have corresponding edges touching n', and vice versa. It depends on edge correspondence.

n and n'—a node from D and a node from D', respectively, used for comparison.

Position similarity—the similarity between the positions of nodes relative to their diagrams.

Region similarity—the similarity between the regions containing nodes.

Structured artifacts—artifacts composed of parts which can be annotated.

Type similarity—the similarity between the types of nodes.

Unnormalized mapping probability—the product of individual correspondence probabilities.

Introduction

We describe an automated framework for determining matches or correspondences between a pair of models. An embodiment of the present invention generally addresses structured artifacts, and more particularly both models (detailed representations, with formal semantics) and diagrams (broader, less rigid representations, not necessarily having an underlying formal model). Although this work clearly applies more broadly, henceforth we focus on IT architectural models. Henceforth, without loss of generality, we often refer simply to diagrams, or simply to models. We define "advanced inexact matching" as any method for determining a mapping between a first artifact and a second artifact, wherein the mapping comprises at least one match between at least one constituent of the first artifact and at least one constituent of the second artifact, and wherein the method comprises steps of:

i) selecting a match comprising one constituent from the first artifact and more than one constituent from the second artifact or more than one constituent from the first artifact and one constituent from the second artifact; or ii) selecting a match based on probability of said match; or iii) selecting a match based on multiple kinds of evidence; or iv) selecting a match that results in a better mapping, by comparing the value of said mapping with the value of another mapping.

Each artifact comprises at least one constituent; each constituent comprises at least one feature, and each feature comprises a characteristic feature of the constituent or a relationship feature of the constituent.

To achieve an automated means of determining the correspondences requires answers to several questions: How should models be represented? Which features of models must be represented? What algorithms should be used to find correspondences? To answer these questions, focus will be directed to the problem of finding correspondences in the domain of IT operational modeling. Operational modeling exists at several levels, from an application view of an IT solution to a physical topology laying out the hardware and software components and their relationship. The main features of an operational diagram can be abstracted to elements found in many other kinds of diagrams. These elements are:

Labeled nodes. A node represents a system component. Each node has text associated with it, usually indicating its purpose. A node may have other attributes, depending on the diagram type. For example, in an operational diagram, an attribute may indicate whether the node is internal or external to the solution. Another common attribute is type, such as "hardware component" or "software component." Attributes may be shown in the diagram textually or pictorially.

Edges. An edge represents a relationship or association. An edge can be labeled, and it links two or more nodes. In operational models, edges indicate communication paths that connect nodes.

Containers. A container is simply a node that contains other nodes. In operational diagrams, for example, a server may contain multiple software components.

Groups. Often nodes are grouped together semantically. For instance, in operational models, servers located in the same building may be grouped within a common region. (Groups are different from containers: a node may belong to multiple groups but can be in only one container.) Like nodes, groups have labels and relationships. For example, regions have an adjacency relationship that indicates a connection.

The information represented by system diagrams can be broadly classified into three types: syntactic information (e.g., nodes, labels, containment, edges), semantic information (e.g., types, defined semantic attributes), and visual information (e.g., position, shape, and color of diagram elements). Incorporating all of these kinds of information is one of the major challenges of diagram matching.

Referring to FIG. 12 there is shown a diagram pair of two different views of the same IT system 2000. Although this diagram pair is highly simplified for presentation purposes, it does exhibit some of the difficulties found in the production models, in particular rough similarities and correspondences that are not one-to-one. At the same time, note that production models typically also contain a number of "less challenging" correspondences.

The model correspondence problem is the problem of finding the "best" correspondence between the elements of two models. The first issue is how to define "best." It may seem appealing to define "best" as the correspondence that preserves a specific semantic relationship between the two diagrams, but this definition would be difficult to apply in practice for several reasons. First, there are many possible semantic relationships between diagrams and it is hard to know which applies. For example, in one case we may have a diagram pair (D, D') where D' is a revision of D, with the semantic relation "is a revision of." In another case, D may be a conceptual description of a system and D' a physical description, with the semantic relation "implements."

Second, if the semantic relationship is known, defining it in precise detail would be difficult, and even a precise definition may have insufficient information to find the best correspondence. Also, generic matching techniques can go a long way in finding correspondence between diagrams without having to incorporate domain-specific knowledge. Third, many diagrams found in practice have no formal semantics: they use informal notions of "boxes" and "lines" to convey context-specific architectural notions.

Despite all this, it has been observed that human experts are able to identify good correspondences between diagrams after careful examination; therefore, it is beneficial to construct a model which mimics this expert reasoning. The framework presented herein takes human expert reasoning principles and applies them to an automated process. This has been done by manually finding the best correspondences for some diagram pairs and recording the reasoning principles used to find the correspondences. Some principles of reasoning about diagram pair correspondence are identified as:

a) Most decisions are made using evidence about which nodes from one diagram D of a pair correspond with which nodes from the other diagram D'.

b) Evidence takes the form of having similar or dissimilar features. For example, if two nodes have the same label, then that is strong evidence that they correspond. Conversely, if two nodes are of different semantic type that is evidence that they do not correspond.

c) Every feature in the diagrams can be important evidence, including text, connection and containment relationships, and geometric and pictorial attributes.

d) Most of the correspondences can be filled in by identifying 1-1 mappings using evidence about node pairs.

e) For a node pair (n, n'), sometimes there is some evidence that n and n' correspond, and other evidence that n and n' do not correspond. This requires a judgment call about which evidence is more important.

f) Special kinds of evidence are required to find correspondences that are not one-to-one. For example, if two nodes are both within the same container, this is evidence that they may be the products of splitting a node.

g) Decisions are also guided by expectations about global properties of good correspondences. For example, we expect most nodes will match to some other node, even if there is no node that is strongly similar.

The goal of the correspondence algorithm according to an embodiment of the present invention is to find correspondences between diagram pairs by a method in accordance with these reasoning principles. Also, the correspondences found by the algorithm should match the expectations of a human expert. Because experts often disagree about the best correspondence, there may be no single best match.

Note that although this problem seems similar to formal matching problems, such as the graph isomorphism problem, it differs in several important ways. Chiefly, there is often no exact solution to this problem, and even determining the "best" correspondence is difficult. Instead, the present invention produces an intelligent "guess" as to the best match, mimicking, as much as possible, what a human expert would do. Additionally, the best matching is often not one-to-one. Finally, human experts rely on many considerations in determining correspondences, including model element labeling, connectivity, spatial position, and commonly applied transformations.

The framework described herein automates correspondence matching in a disciplined, quantitative fashion, using the above observations and employing Bayesian methods for combining many kinds of reasoning. The correspondence algorithm represents models and diagrams as graphs whose nodes have attributes such as label, type, connections, and containment relations. Probabilistic models have been developed as part of the method embodiment for rating the quality of candidate correspondences based on several of these attributes of the nodes in the graphs. Given the probabilistic models, a user can find high quality correspondences using known search algorithms. A comprehensive discussion on this method can be found in "A Bayesian Approach to Diagram Matching with Application to Architectural Models," David Mandelin, UC Berkeley, Doug Kimelman, IBM Corporation, and Daniel Yellin, IBM Corporation, ICSE 2006, May 20-28, 2006, Shanghai, China, which is incorporated herein by reference in its entirety, as if fully set forth herein.

Overview of Algorithm

Glossary of Basic Concepts/Terminology 1. structured artifact e.g. an operational model diagram. The algorithm determines a mapping between one artifact and another.

2. constituent of an artifact e.g. a server node (a.k.a. a server model element)

3. feature of a constituent e.g. a label of a server node. Either a characteristic or a relationship.

4. characteristic of a constituent e.g. a label of a server node 5. relationship of a constituent e.g. a "hosts" relationship between a server node and a component node 6. constituent pair e.g. a node pair consisting of a node from one model (of a given pair of models) and a node from the other model e.g. a server node labeled 'AppServer' in an operational model diagram labeled 'Specified Level,' and a server node labeled 'WebSphere' in an operational model diagram labeled 'Physical Level'

7. match e.g. a node pair in which the nodes do in fact match e.g. a server node labeled 'AppServer' in an operational model diagram labeled 'Specified Level' matching a server node labeled 'WebSphere' in an operational model diagram labeled "Physical Level". Note: In addition to (1:1) "pair matches," this implementation supports 1:n ("split") and n:1 ("merge") matches (henceforth jointly referred to as "split/merge matches") e.g. a server node labeled 'WebServer' in an operational model diagram labeled 'Conceptual Level' matching a server node labeled 'StaticConent' and a server node labeled 'DynamicContent' in an operational model diagram labeled 'Specified Level'. Also note: This implementation does not, however, support m:n matches.

8. mapping e.g. a set of matches for a given pair of models. Note: The matches are disjoint. This means that no node is part of more than one match. Also note: A node (from either model) that is not part of any match is said to be "dropped".

Basic Approach

We are looking for the most likely mapping from one given model to another given model, that is, the mapping that has the highest probability of being "correct," or "closest to reality." In essence, we are searching a space of possible mappings, looking for the most likely one. We do that by progressively building up a single mapping, at each stage adding another match to the (partial) mapping that we have accumulated so far. At each stage, we try out a number of alternatives for the match to be added in next, seeing which one gives us the most likely partial mapping (which we then take to be the most promising partial mapping). This is known as a "greedy" approach. When we can no longer improve the likelihood of the current partial mapping by adding in another match, we conclude that the current partial mapping is the most likely mapping (and we are done).

The likelihood of a mapping—the probability that it is "correct"—is basically the (unnormalized) accumulated product of the likelihood/probability of its individual matches. The overall likelihood of an individual match—the probability that it is "correct"—is a (normalized) combination of accumulated products of the likelihood/probability of each of a number of kinds of "evidence"—the degree of a certain kind of similarity between the nodes of the match (e.g. similar labels, similar positions in their respective model diagrams, similar "neighbors," and so on). In principle, as is discussed in greater detail in the paper cited above, we are using Bayesian inference on a naive Bayes model joint probability distribution over multiple kinds of evidence.

For purposes of Bayesian inference, "training runs" must be done on known sample model pairs, before starting to do the "production runs" that determine mappings for arbitrary given model pairs. In these training runs, similarities are observed between nodes in known matches in known model pairs—the "training sets"—and parameters are set reflecting probability distributions that indicate what kinds of similarities are typical between matching nodes. Bayesian inference relies on these probability distributions to determine the likelihood that given nodes match, given similarities observed between them.

One additional note beyond these basics: At each stage, we add another pair of matching nodes to the mapping, but this might not actually add another (separate) match. This might give us another separate match in the mapping, or it might turn an existing pair match into a split/merge match, or it might add another node to an existing split/merge match.

Basic Evidencer Concepts 1. evidencer—An evidencer is a component that determines the degree, or amount, of a particular kind of similarity between a given set of nodes, e.g. the label evidencer determines how similar two nodes are according to label, whereas the position evidencer determines how similar two nodes are according to their position within their respective diagrams. An evidencer also determines the likelihood, or probability, of the similarity that the evidencer has already determined for the set of nodes, if it were known that the set of nodes matches. In fact, an evidencer also determines the likelihood of the similarity if it were known that the set of nodes did not match. As discussed above, determination of likelihood of a given similarity is based on training. An implementation of the algorithm will have a number of evidencers, each contributing towards the determination of the overall likelihood that a given set of nodes matches.

2. discrete evidencer—An evidencer based on discrete similarity values i.e. each similarity value is drawn from a fixed (small) set of possible values e.g. same, close, far.

3. continuous evidencer—An evidencer based on continuous similarity values i.e. each similarity value is drawn from a given range e.g. between 0.0 and 1.0 inclusive.

4. simple evidencer—An evidencer that determines similarity values based solely on the characteristics of the pair of nodes for which similarity is being determined. (These similarity values can be computed once at the beginning of a production run for all possible pairs, and cached for the rest of the run.)

5. complex evidencer—An evidencer that determines similarity values partly based on other matches already in the (partial) mapping that has been built up so far e.g. similarity based on whether the nodes of a pair are connected to matching neighbors. (These similarity values must be recomputed each time the mapping changes, at various stages throughout the run.)

6. pair evidencer—An evidencer that determines similarity (and probability) for pairs of nodes.

7. split/merge evidencer—An evidencer that operates directly on split/merge matches (1:n or n:1 configurations of nodes), rather than pair matches (1:1 configurations of nodes). Rather than determining similarity based on the value of a particular feature (e.g. label) for each of a pair of nodes, a split/merge evidencer can determine similarity based on a "computed feature" of a selection of the nodes of the configuration (e.g. the similarity between the label of the node on the "1" side of the configuration, and the longest common suffix of the labels of all of the nodes on the "n" side of the configuration), or it can determine a "similarity" which in fact is just a score or an indication of the extent to which a certain criterion is satisfied by the configuration of nodes taken as a whole (e.g. that all of the nodes on the "n" side of the configuration are all interconnected). In some cases, the similarity value of a split/merge evidencer is in fact a Boolean value, as in the previous example. As is discussed in detail below, when determining the overall likelihood of a split/merge match, as opposed to a pair match, the algorithm uses both pair evidencers and split/merge evidencers. For each pair evidencer, the evidencer is applied to each possible pair consisting of the node from the "1" side of the configuration and one of the nodes from the "n" side of the configuration, and the minimum similarity over all such pairs is used in determining likelihoods according to that evidencer. The overall likelihood of the split/merge match will then be determined based on likelihoods/probabilities from each of the pair evidencers as well as from each of the split/merge evidencers.

Roster of Evidencers

The following is the roster of evidencers employed in one embodiment. Below, we often use n1'n1' to refer to the first node of a pair of nodes that is being considered as a pair match, and we use n2'n2' to refer to the second. As well, we often use 'nm' to refer to the nodes on the "n" side of a 1:n split or an n:1 merge, and n1'n1' to refer to the node on the "1" side.

Simple Continuous Pair Evidencers:

Label Evidencer—Similarity is based on the (textual) label of the nodes. The similarity function of the Label Evidencer computes similarity as the fraction of characters of both labels that are contained in substrings that are common to the labels. For example, in "Data Services" and "SQL Database Server," common substrings (not including spaces) include: "Data," "Serv," and "e," and the fraction would be (4+4+1)*2/(12+17)=0.62. Commonly found substrings, such as "server," "system," or "node," are converted to tokens ahead of time in order not to outweigh other (more meaningful) similarities. Another embodiment weights commonly occurring substrings according to rarity.

Position Evidencer—Similarity is based on the relative position of nodes within their respective diagrams. The Position Evidencer similarity function first transforms node position coordinates into a common coordinate system (by determining a bounding box in each diagram, and scaling a node's coordinates relative to its bounding box), then it computes the Euclidian distance between the nodes (scaled to the range 0.0-1.0 by dividing by the maximum possible distance), and finally it computes similarity as the inverse of the distance.

Simple Discrete Pair Evidencers:

Type Evidencer—Similarity is based on the type of the nodes. In the models being considered, a node has a type, and types are organized hierarchically. The Type Evidencer similarity function returns "EQUAL" if n1's type is the same as n2's type; it returns "CLOSE" if n1's type is an ancestor or descendant or sibling of n2's type; and it returns "FAR" otherwise. In another embodiment, a mapping could be established between the type hierarchy for n1's model and the type hierarchy for n2's model, and similarity could be based on corresponding types e.g. similarity would be "CLOSE" if n1's type is an ancestor or descendant or sibling of a type that corresponds to n2's type.

Region Evidencer—Similarity is based on the regions that contain the nodes. The models being considered may have regions that contain nodes, and a region would have a label, a set of neighboring regions, and a set of contained nodes. The Region Evidencer similarity function relies on a mapping between the regions of n1's model and the regions of n2's model. That mapping is established based on the labels of the regions, using the Label Evidencer similarity function. The Region Evidencer similarity function returns "SAME" if the region of n1 matches the region of n2; it returns "ADJACENT" if n1's region matches a region that borders (is adjacent to) n2's region; and it returns "FAR" otherwise. For models that have no regions, the similarity function always returns "SAME".

Complex Continuous Pair Evidencers:

Local Connection Evidencer—Similarity is based on the connections that each node has to other nodes (its "immediate neighbors") in its model. The Local Connection Evidencer similarity function computes similarity as the average of: 1) the fraction of n1's immediate neighbors that match immediate neighbors of n2, and 2) the fraction of n2's immediate neighbors that match immediate neighbors of n1. Note: This only considers immediate neighbors that already have a match i.e. are already in the (partial) mapping that has been built up so far. If it is the case for either n1 or n2 that it has no immediate neighbors, or none of its immediate neighbors yet has a match, then the similarity value is 0. If that is the case for both n1 and n2, then the similarity value is −1.

Continuous Split/Merge Evidencers:

LabelSim Evidencer—Similarity is based on the labels of the 'nm' nodes. A similarity value is obtained from the Label Evidencer similarity function for each possible pair of nodes drawn from 'nm', and the minimum of those similarity values is the similarity value returned by the LabelSim evidencer similarity function. For example, if the split being considered were (a, (a', b', c')) i.e. node a is the n1 node, and nodes a', b', and c' are the nm nodes, the LabelSim split evidencer would return the similarity value min(Label.sim(a', b'), Label.sim(a', c'), Label.sim(b', c')). Note that this does not consider the similarity of n1 to any of the nm nodes; it is concerned strictly with how similar all the nm nodes are to each other.

LabelIntersect Evidencer—The LabelIntersect Evidencer similarity function uses the Label Evidencer similarity function to obtain the similarity between the label of n1 and the longest common suffix among the labels of the nm nodes, and it returns that as the similarity value. For example, if the split being considered were ("Database", ("Primary Database", "Backup Database")), the similarity between "Database" and "Database" would be returned.

LabelConcat Evidencer—The LabelConcat Evidencer similarity function uses the Label Evidencer similarity function to obtain the similarity between the label of n1 and the concatenation of the labels of the nm nodes, and it returns that as the similarity value. For example, if the split being considered were ("App&DirectoryServer", ("AppServer", "DirectoryServer")), the similarity between "App&DirectoryServer" and "AppServerDirectoryServer" would be returned. In another embodiment, the function partitions the label of n1 into parts, each of which matches part of a label of one of the nm nodes, and then determines a similarity for each nm node based on the parts of the n1 label that match its label, and finally the function then returns the sum of the nm similarities.

Boolean Split/Merge Evidencers:

Connect Evidencer—Similarity is based on the connections between the nm nodes. The Connect Evidencer similarity function returns TRUE if every nm node is reachable from any other nm node. In another embodiment, the Connect Evidencer is a continuous split/merge evidencer whose similarity function is a measure of how close the nm nodes are to each other—the similarity value is inversely proportional to the largest number of edges that must be traversed to get from one nm node to another; and if there is an nm node which cannot be reached at all from some other nm node, then the similarity value is 0.

Contain Evidencer—The Contain Evidencer similarity function returns TRUE if all of the nm nodes are in the same containing node.

Glossary of Implementation Concepts/Terminology:

1. p1, p0—Throughout the flowcharts, variables with name 'p1' are used to hold a probability of a given similarity occurring if it were known that a set of nodes (a 1:1 pair, or a 1:n split, or a n:1 merge) match. Similarly, a variable 'p0' holds a probability of a given similarity occurring if it were known that a set of nodes does not match.

2. prod1, prod0—Throughout the flowcharts, variables with name 'prod1' are used to accumulate a product of 'p1' values. Similarly, a variable 'prod0' accumulates a product of 'p0' values.

3. n1, n2—Throughout the flowcharts, variables with name n1'n1' are used to hold the first node of a pair of nodes. Similarly, a variable n2'n2' holds the second node of a pair. So, for example, at some step we might be determining the probability that n1 matches n2.

4. nm—Throughout the flowcharts, variables with name 'nm' are used to hold the multiple nodes of the "n" side of a 1:n split or a n:1 merge. So, for example, at some step we might be determining the probability that n1 split into nm, or that nm merges into n1.

System Overview

Figure 11:
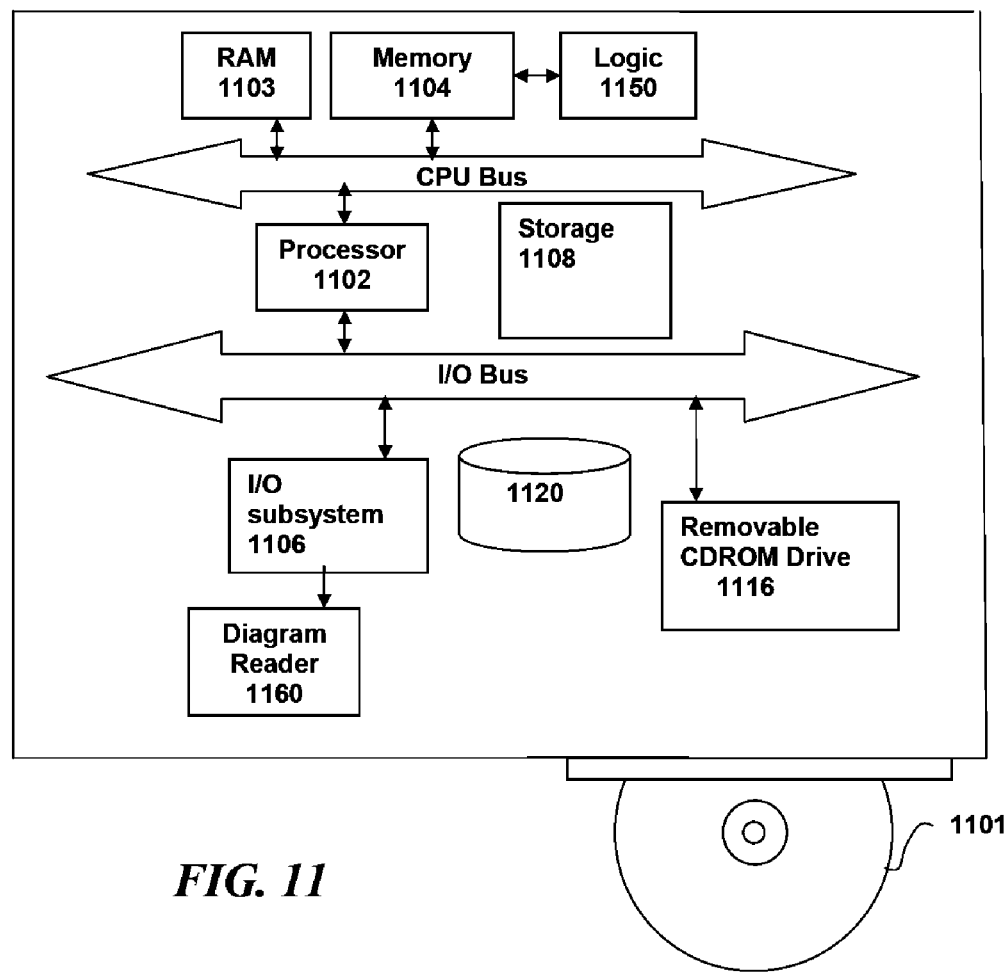
FIG. 11 is a simplified block diagram of an information processing system configured to operate according to an embodiment of the present invention.

Referring to FIG. 11 there is shown a block diagram of an information handling system 1100 according to an embodiment of the invention. For purposes of this invention, computer system 1100 may represent any type of computer, information processing system or other programmable electronic device, including a client computer, a server computer, a portable computer, an embedded controller, a personal digital assistant, and so on. The computer system 1100 may be a stand-alone device or networked into a larger system.

The system 1100 could include a number of operators and peripheral devices as shown, including a processor 1102, a memory 1104, an input/output (I/O) subsystem 1106, and storage 1108. The processor 1102 may be a general or special purpose microprocessor operating under control of computer program instructions executed from memory 1104. The processor 1102 may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory 1104 that perform their respective functions when executed. These may share an instruction processor, such as a general purpose integrated circuit microprocessor, or each sub-processor may have its own processor for executing instructions. Alternatively, some or all of the sub-processors may be implemented in an ASIC.

The memory 1104 represents either a random-access memory or mass storage. It can be volatile or non-volatile. The memory may be partitioned or otherwise mapped to reflect the boundaries of the various memory subcomponents. RAM 1103 may be embodied in one or more memory chips. In order to implement the correspondence algorithm as an embodiment of the present invention, the memory 1104 comprises logic 1150.

The system 1100 can also comprise a magnetic media mass storage device 1120 such as a hard disk drive. The I/O subsystem 1106 may comprise various end user interfaces such as a display, a keyboard, and a mouse. The I/O subsystem 1106 may further comprise a connection to a network such as a local-area network (LAN) or wide-area network (WAN) such as the Internet. Processor and memory components are physically interconnected using conventional bus architecture. The system 1100 may include a CD/DVD ROM drive 1116 for a signal bearing medium such as a CDROM 1101.

What has been shown and discussed is a highly-simplified depiction of a programmable computer apparatus. Those skilled in the art will appreciate that other low-level components and connections are required in any practical application of a computer apparatus.

Algorithm Flowcharts

FIG. 1 illustrates a flowchart for the matching algorithm used to perform Structured Artifact Matching in accordance with the present invention. The matching algorithm is initiated at step 101 and continues to step 102. In step 102, the Diagram Reader 1160 receives as input the diagrams (models) D and D', including the nodes of the models, and the features of those nodes, and stores them in storage 1208.

It then proceeds to step 103, where similarity and probability are pre-computed (and cached) by the processor 1102 for all possible node pairs by all simple evidencers.

It then proceeds to step 104, where it searches for a mapping between the two models. In step 105, the algorithm produces as output the mapping which was found, in the form of a set of node matches between the models. The algorithm terminates at step 106.

Figure 2:
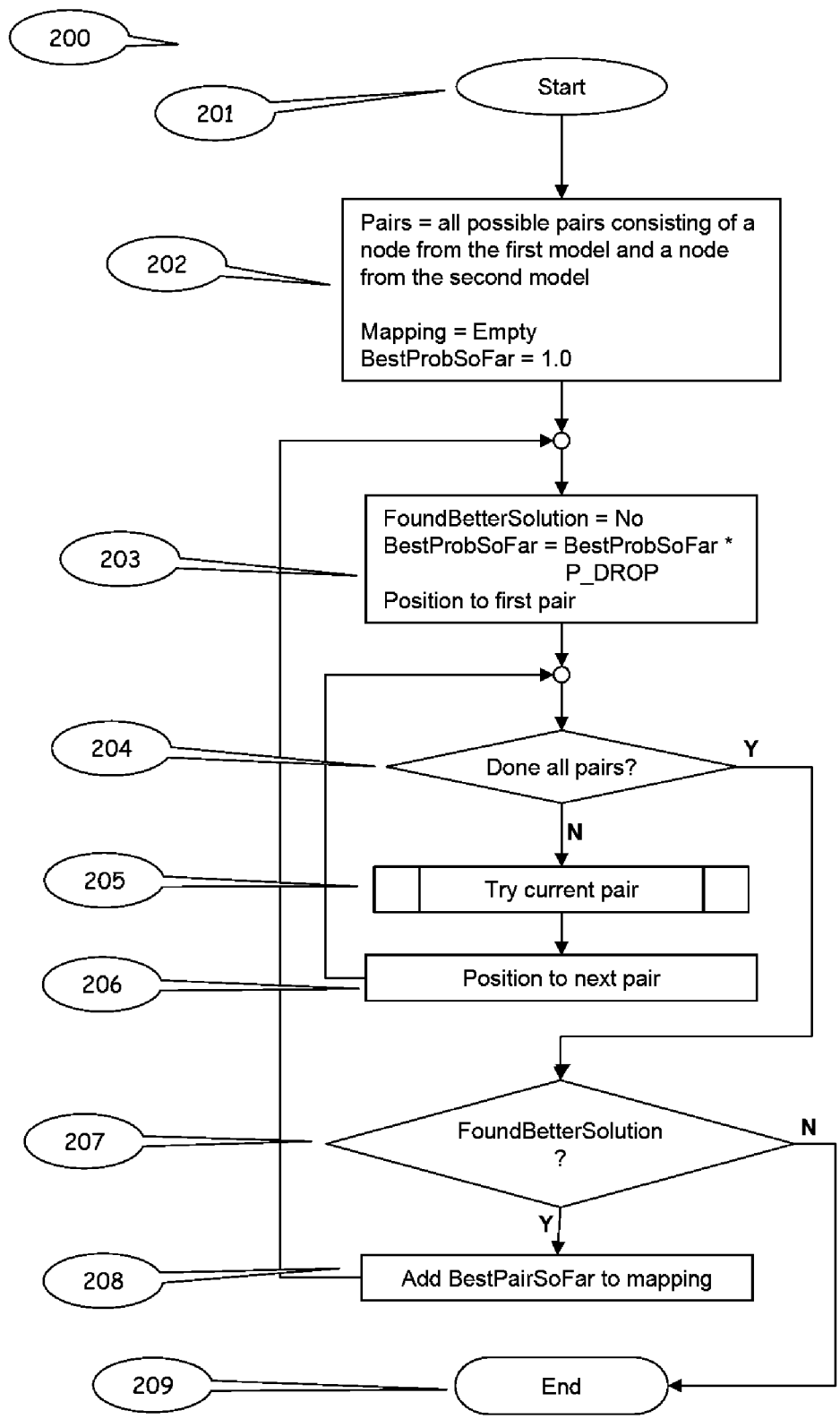
FIG. 2 is a flowchart illustrating the process of searching for a mapping, according to an embodiment of the present invention.

FIG. 2 illustrates a flowchart for the search process used by the matching algorithm in accordance with the present invention. The search algorithm starts with two sets of nodes (nodes from D and nodes from D'), and a set of evidencers. It uses the evidencers to evaluate the probability of matches between nodes from each of the two sets, with a goal towards establishing a mapping between the sets of nodes.

Referring now to FIGS. 2-10, operation of an exemplary embodiment of the present invention will be described.

The search algorithm starts at step 201 and continues to step 202. In step 202, the search algorithm performs initialization of the variables "Mapping" to empty, "Pairs" to the complete set of all possible node pairs from the two node sets, and "BestProbSoFar" probability to 1.0. It then continues to step 203.

In step 203, the algorithm initializes "FoundBetterSolution" to "No," multiplies the probability of the partial mapping, "BestProbSoFar" by factor "P_DROP" and positions itself at the first candidate pair (from "Pairs"). It then goes on to step 204. P_DROP is a constant value representing the probability that a given node is not included in the mapping.

In step 204, the algorithm determines whether all candidate node pairs have been processed. If they have not, then it continues on to step 205, where it processes the current candidate pair (described in detail in FIG. 3). Note that the logic that processes the current candidate pair refers to and updates the values of "FoundBetterSolution," "BestProbSoFar," and "BestPairSoFar" used here. After processing the candidate pair, the algorithm proceeds to step 206, where it positions itself at the next node pair in the set of candidates, and returns to step 204.

If step 204 indicates that all of the candidates have been processed, then the algorithm drops down to step 207. The algorithm determines whether or not a better solution for the mapping was found. If it was, then the processing of a candidate pair will have stored the new node pair and mapping probability in "BestPairSoFar" and "BestProbSoFar." In this case, control goes to step 208, where the pair of nodes in "BestPairSoFar" is added into the mapping. Note that, as discussed above, adding a pair to the mapping might give us another separate pair match in the mapping, or it might turn an existing pair match into a split/merge match, or it might add another node to an existing split/merge match. The algorithm then returns to step 203, where "FoundBetterSolution" is reset to "No," and the new "BestProbSoFar" probability is multiplied by the constant value "P_DROP" (in essence, we will now be looking for a "less partial" mapping—one that incorporates one more node—and we will be comparing the probability of our best partial mapping so far plus a decision to include one more node vs. the probability of our best partial mapping so far plus the decision to exclude that node, P_DROP being the probability that a given node is not included in the mapping). Then the set of candidates is traversed once more in an attempt to add another node pair to the new partial mapping.

If the algorithm reaches step 207 and the mapping has not changed, then the algorithm falls through to step 209, where the search terminates.

Figure 3:
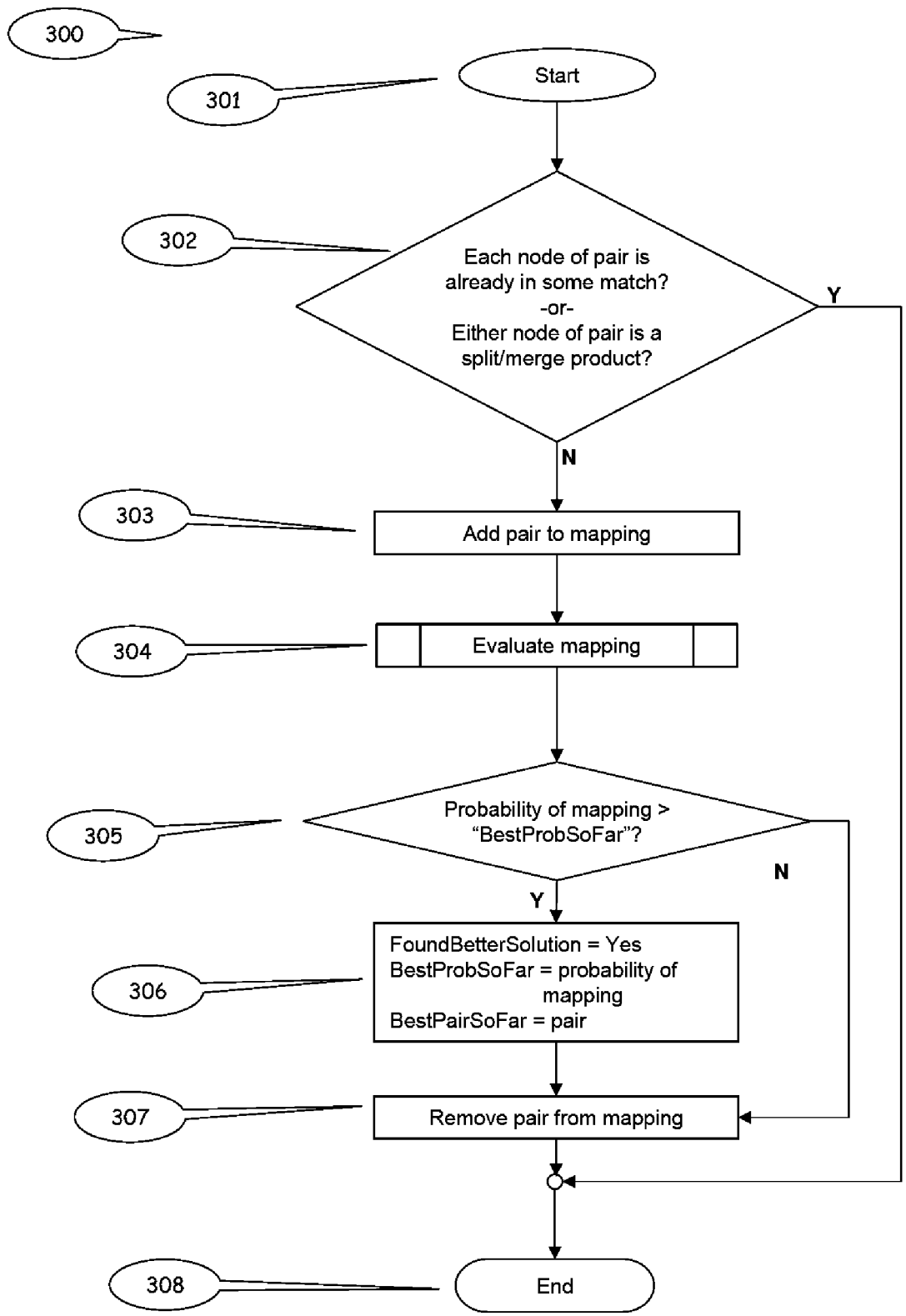
FIG. 3 is a flowchart illustrating the process of trying a current pair, according to an embodiment of the present invention.

Referring to FIG. 3 there is shown a flowchart of the process for trying a candidate pair (this is step 205 from FIG. 2). The process begins at step 301 with examining the candidate pair. In step 302 a decision needs to be made. Is each node of the pair already in some match? Or is either node of the pair a split/merge product? A node being a "split/merge product" means it is on the "n" side of a 1:n or n:1 match. (Hence, another node cannot be matched to it, because that would result in an m:n match which this implementation does not support). If the answer to both of the above two questions is No, then the algorithm continues to step 303. If the answer to either of the two questions above is Yes, then this node pair is not considered to be eligible for adding to the mapping, and the algorithm proceeds directly to step 308, where processing of the candidate pair is terminated.

Figure 4:
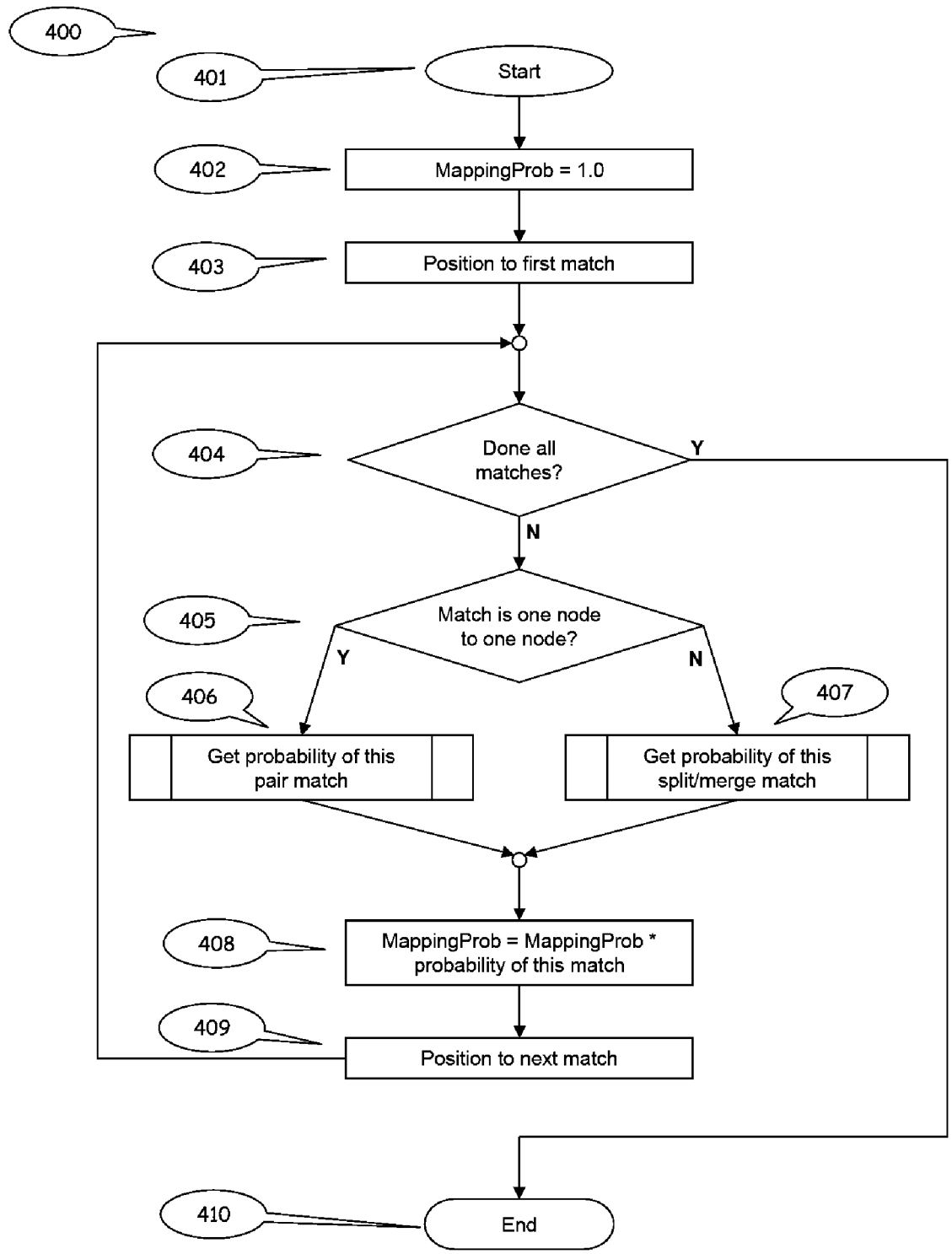
FIG. 4 is a flowchart illustrating the process of evaluating a mapping, according to an embodiment of the present invention.

At step 303, the algorithm adds this candidate pair to the existing mapping. As was discussed above, adding a pair into the mapping might result in a totally new match in the mapping, consisting of just that pair. Or, if one of the nodes of the pair is already in a match, then the other node is added into the other side of that match to produce a split or a merge. On the following step, step 304, an evaluation function is called to evaluate the probability of the mapping with this pair added in. Refer to FIG. 4 for a flowchart of the evaluation function, which is described below in further detail.

The value returned by the evaluation function is examined in step 305, and compared against the best probability of the partial mapping that we have so far. If the new probability is greater than this value, then we proceed to step 306. Here it sets "FoundBetterSolution" to "Yes," saves the probability into "BestProbSoFar," and the pair of nodes into "BestPairSoFar." Recall that these saved values are referred to in FIG. 2, and discussed above.

Once these values have been updated, the algorithm proceeds to step 307, where the node pair is removed from the mapping. It then goes on to step 308, indicating that processing of this candidate pair has terminated.

If, on the other hand, the step 305 indicates that the new mapping probability is not better than the probability we have so far, then the algorithm goes directly to step 307, where it removes the candidate pair from the mapping. It then moves on to step 308, indicating that processing of this candidate pair has terminated.

FIG. 4 illustrates a flowchart for the algorithm used to perform evaluation of the probability of a mapping in accordance with the present invention (from step 304 of FIG. 3).

The evaluation function starts at step 401 and continues to step 402, where it initializes the probability of the mapping "MappingProb" to "1.0." In step 403, the evaluation algorithm positions itself at the first pair in the set of matches in the mapping. From there it continues to step 404, to determine if it has processed all of the matches. If it has, then the evaluation is terminated. The algorithm goes to step 410, and returns the probability.

If step 404 indicates that there are more matches to process, then the algorithm proceeds instead to step 405. In this step, the function determines whether this match represents a pair (1:1) match, or a split/merge. If the match is a pair match, then it proceeds to step 406, where it evaluates the probability of the 1:1 pair match. Alternatively, if the match is 1:many or many:1, then the function proceeds to step 407, where it evaluates the probability of a split/merge match. (Note that many:many matches are not used in the matching algorithm. This error condition is not represented in the flowchart.) Further details on the evaluation of the probability of a match can be found below with reference to FIGS. 5 and 6.

In either case, having evaluated the probability of the match, the algorithm proceeds to step 408, where it multiplies the probability of the mapping "MappingProb," by the probability for the current match. It then continues on to step 409, and positions itself at the next pair in the set of matches. Finally, it returns to step 404, to either continue with the evaluation or to terminate the function. At termination, the function returns the mapping probability which is the product of the probabilities of the matches.

Figure 5:
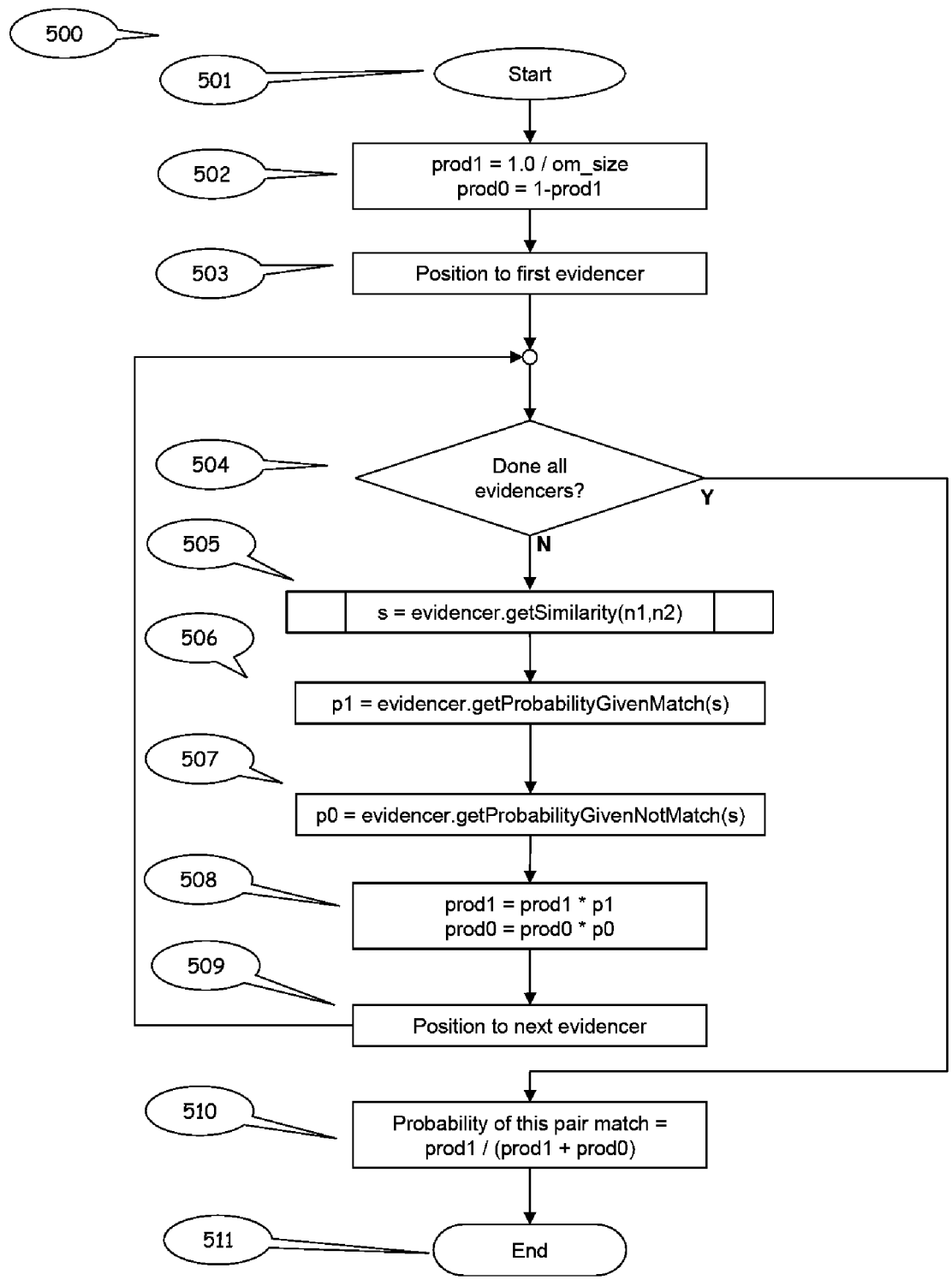
FIG. 5 is a flowchart illustrating the process of getting the overall probability of a pair match, according to an embodiment of the present invention.

FIG. 5 illustrates a flowchart for the algorithm used to perform the evaluation of the probability of a pair match (n1, n2) in accordance with the present invention. The probability is based on the computation of "prod1" and "prod0" with the use of a set of evidencers.

The evaluation function starts at step 501 and continues to step 502, where it initializes the value of "prod1" to "1/om_size" where om_size is the number of nodes in the second model of the model pair ("prod1" is being initialized to the "prior" from Bayes Theorem), and "prod0" to "1-prod1."

In another embodiment, "prod1" is initialized to "P_PAIR/om_size". P_PAIR is the probability that a node of one diagram is matched with exactly one node of the other diagram (as opposed to being "dropped" or being matched to multiple nodes of the other diagram in a split/merge match). Then "P_PAIR/om_size" is the (prior) probability that a node of one diagram exactly matches a particular node of the other diagram, in this case: that the first node of the given pair matches exactly the second node of the given pair.

During training, the value of P_PAIR is set to: "NP/NN" where NP is the number of nodes from first models across all model pairs that are involved in known pair matches, and NN is the total number of nodes in first models across all model pairs. Similarly, the value of P_DROP, which was discussed above, would be set during training to be the number of known dropped nodes across all first models divided by the total number of nodes across all first models. Finally, P_SPLIT would be set to the number of first model nodes involved in split/merge matches divided by the total number of first model nodes. Note that P_DROP+P_PAIR+P_SPLIT will equal 1.0.

At step 503, the algorithm then positions itself at the first of the set of evidencers. From there it goes to step 504, where it determines if it has processed all of the evidencers.

If step 504 indicates that there are still more evidencers to process, then the algorithm goes to step 505, where it uses the current evidencer to get a similarity value for (n1, n2).

After getting the similarity value, the algorithm continues to step 506, where one of the probability functions that was generated during training for this evidencer is used to get a probability value "p1." The probability function takes the similarity value obtained in step 505 as a parameter, and returns the probability of this similarity value occurring if it were known that the pair of nodes matched.

Step 507 uses one of the probability functions that was generated during training for this evidencer, to get a probability value "p0." This probability function takes the similarity value obtained in step 505 as a parameter, and returns the probability of this similarity value occurring if it were known that the pair of nodes did not match.

Finally, after getting values for "p1" and "p0," the function proceeds to step 508, where it multiplies "p1" into "prod1", and "p0" into "prod0." It then goes on to step 509, where it positions itself at the next of the evidencers, and returns to step 504.

Once step 504 indicates that all of the evidencers have been processed, then the algorithm proceeds directly to step 510. At step 510, the probability that the pair of nodes matches, i.e. the overall likelihood of this match, is computed as "prod1/(prod0+prod1)." The function continues to step 511, at which point it is done, and the value of the probability is returned.

Figure 6:
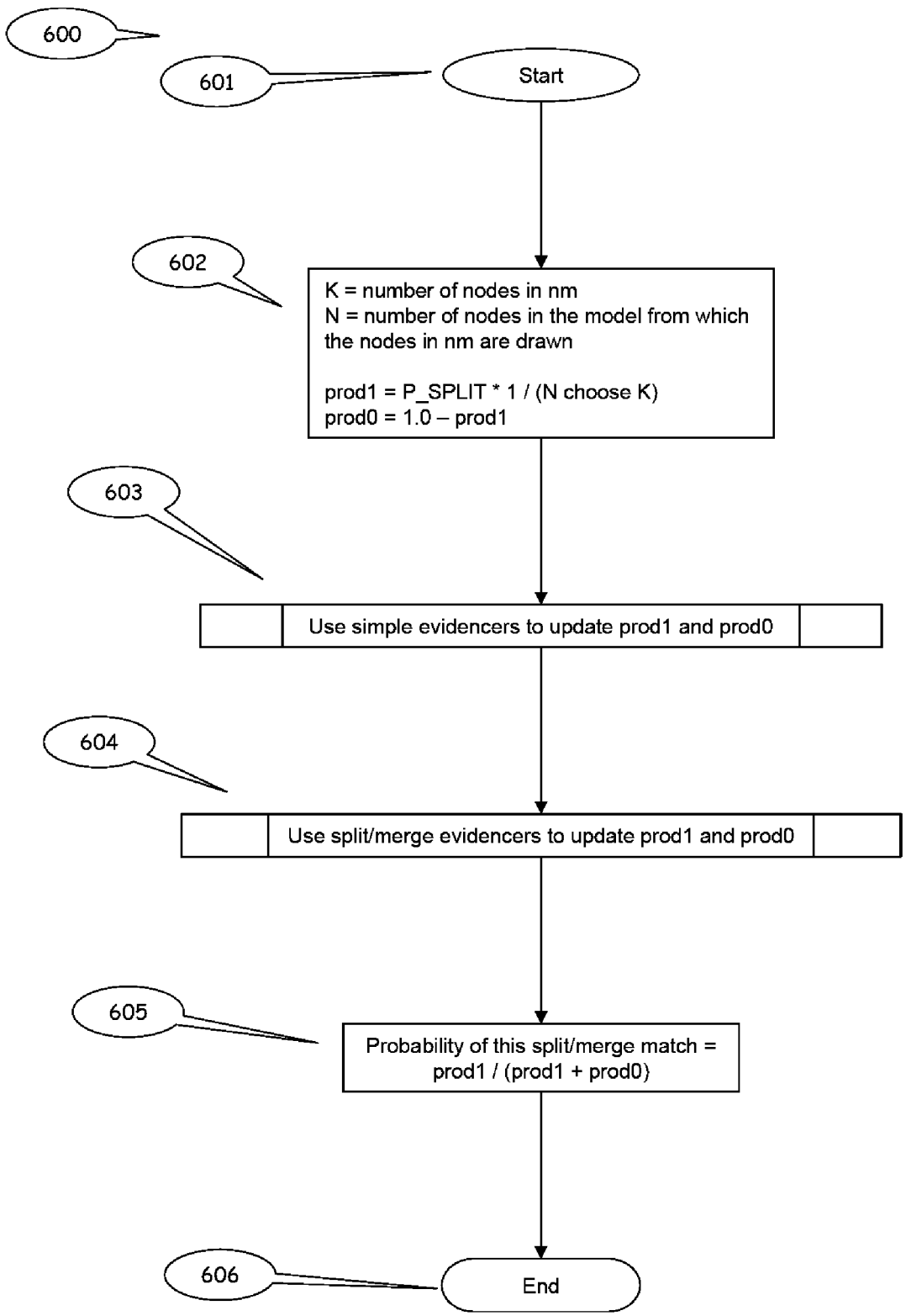
FIG. 6 is a flowchart illustrating the process of getting the overall probability of a split/merge match, according to an embodiment of the present invention.

FIG. 6 illustrates a flowchart for the algorithm used to perform evaluation of the probability of a split/merge (n1, nm) in accordance with the present invention. The probability is based on the computation of "prod1" and "prod0" with the use of two sets of evidencers.

Figure 7:
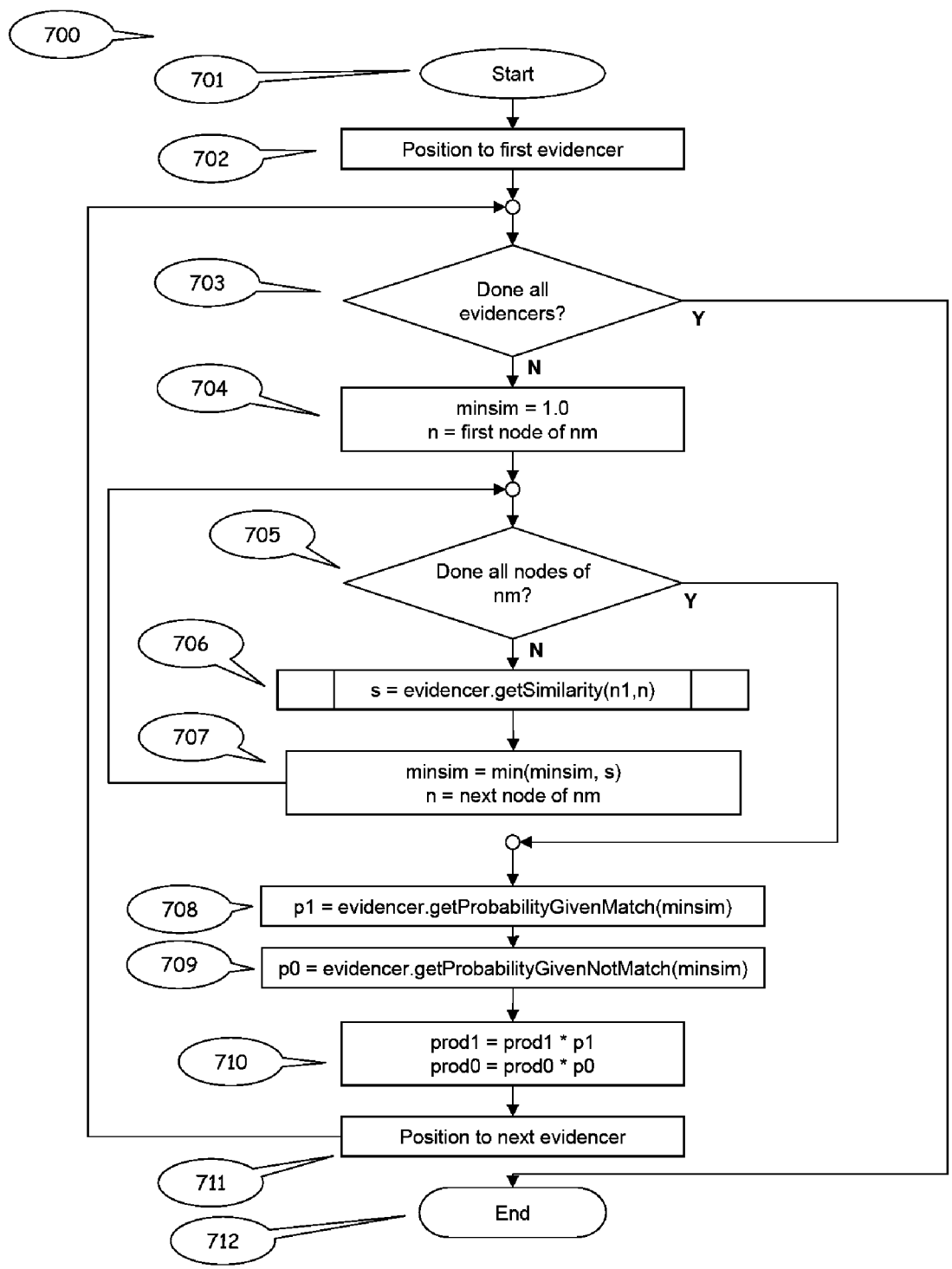
FIG. 7 is a flowchart illustrating the process of using simple evidencers to update prod1 and prod0 for a split/merge match, according to an embodiment of the present invention.

The evaluation function starts at step 601 and continues to step 602. Value "K" is equal to the number of nodes in nm, and value "N" is equal to the number of nodes in the model from which the nodes in nm are drawn. The function initializes "prod1" to "P_SPLIT*1/(N choose K)", and "prod0" to "1-prod1". 'P_SPLIT' is the probability that there will be a 1:k split or k:1 merge. 'P_SPLIT*1/(N choose K)' is the probability of this particular 1:k split or k:1 merge. It then advances to step 603, where it uses the simple evidencers to update prod1 and prod0. Refer to FIG. 7 for a flowchart for using simple evidencers to update prod1 and prod0.

Figure 8:
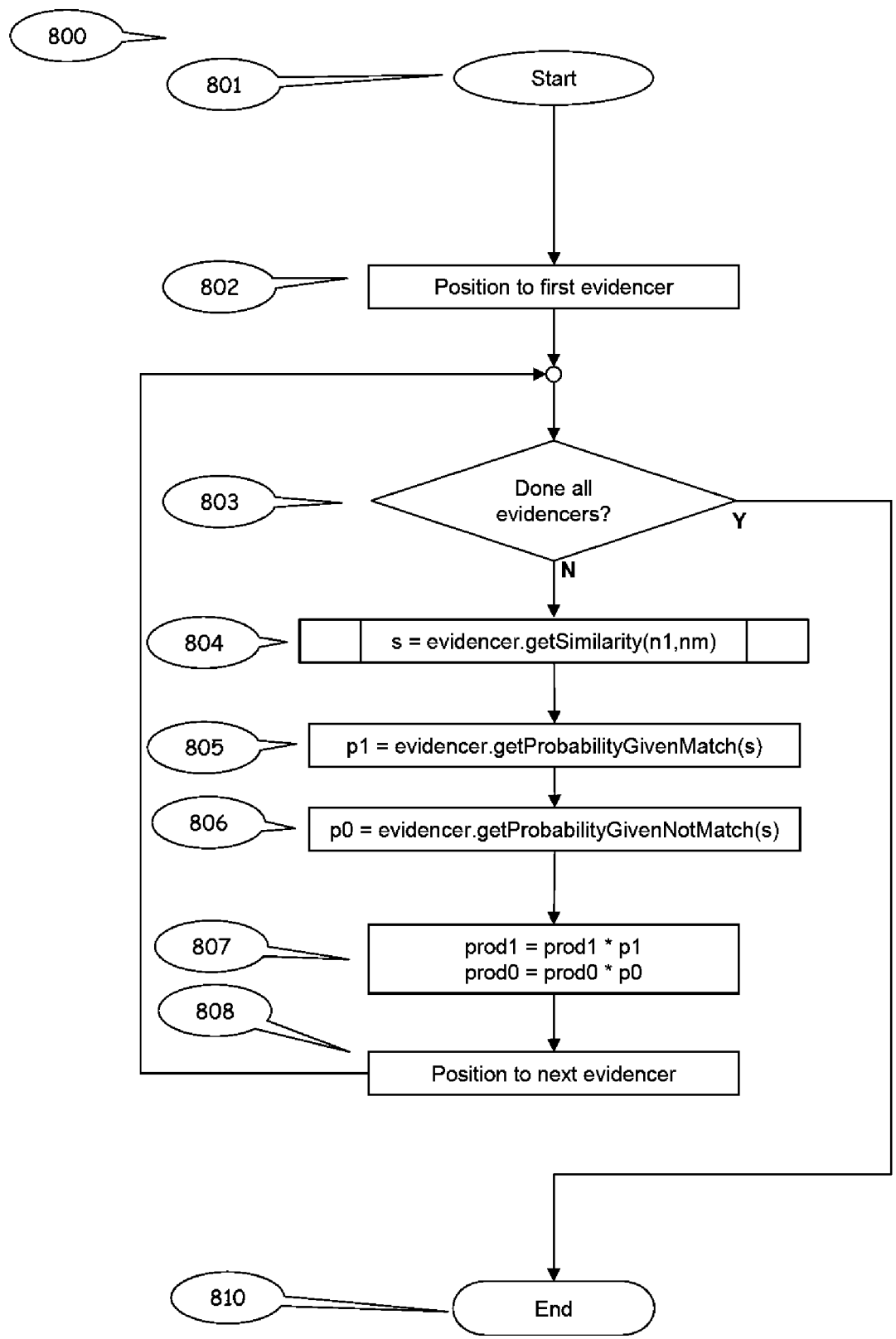
FIG. 8 is a flowchart illustrating the process of using split/merge evidencers to update prod1 and prod0, according to an embodiment of the present invention.

The algorithm then advances to step 604, where it uses the split/merge evidencers to update prod1 and prod0. Refer to FIG. 8 for a flowchart for using split/merge evidencers to update prod1 and prod0, which is described below in further detail.

Once "prod1" and "prod0" have been updated, the algorithm proceeds to step 605, where it sets the probability of this split/merge match to "prod1/(prod0+prod1)". The function continues to step 606, at which point it is done, and the value of the probability is returned.

FIG. 7 illustrates a flowchart for the algorithm used by the simple evidencers to update "prod1" and "prod0" in accordance with the present invention. The function starts at step 701 and continues to step 702, where it positions itself at the first of the set of simple evidencers. From there it goes to step 703, where it determines if it is done processing all of the simple evidencers. If it is not done, then it proceeds to step 704.

Essentially, steps 704-707 find the minimum similarity among "n1" and each of the nodes in "nm." At step 704, the function initializes the similarity value "minsim" to 1.0, and positions itself at the first node "n" in the set of nodes "nm". From there it goes to step 705, to determine if it has processed all of the nodes in "nm". If it has not, then it proceeds to step 706.

Step 706 uses the simple evidencer to get a similarity value for (n1, n). The function then continues to step 707, where it sets "minsim" to the lesser value between the new similarity value and the existing "minsim." It then positions itself to the next node "n" in "nm", and returns to step 705.

Once step 705 indicates that all of the nodes in "nm" have been processed, the algorithm proceeds to step 708, where one of the probability functions that was generated during training for the simple evidencer is used to get a probability value "p1". This probability function takes the similarity value "minsim" as a parameter, and returns the probability of this similarity value occurring if it were known that the pair of nodes matched.

Another embodiment, rather than finding the minimum similarity and then getting the probability of that similarity, instead gets the probability of each similarity and then finds the minimum of those probabilities.

Similarly, step 709 uses the similarity value "minsim", and one of the probability functions generated during training, to get a value for "p0", the probability of this similarity value occurring if it were known that the pair of nodes did not match.

Having found values for "p1" and "p0", the function moves on to step 710, where it multiplies these values into "prod1" and "prod0" respectively. In step 711, it then positions itself at the next of the simple evidencers, and returns to step 703 to continue processing. Once step 703 indicates that all of the simple evidencers have been processed, the function proceeds to step 712, where processing of simple evidencers to update prod1 and prod0 is terminated.

FIG. 8 illustrates a flowchart for the algorithm used by the split/merge evidencers to update prod1 and prod0 in accordance with the present invention. The function starts at step 801 and continues to step 802, where it positions itself at the first of the set of split/merge evidencers. In this figure, when we refer to an 'evidencer', we mean a 'split evidencer'. From there it goes to step 803, to determine if all of the split/merge evidencers have been processed. If they have not, then it continues to step 804. Here it uses the split/merge evidencer to get a similarity value for (n1, nm). Recall that, as discussed above, the similarity function of a split/merge evidencer might consider both n1 and nm, or it might only consider the nodes of nm.

After getting the evidencer's similarity value, the algorithm continues to step 805, which uses the similarity value to get a probability value "p1". This represents the probability of this similarity value occurring if it were known that (n1, nm) match. Step 806 uses the similarity value obtained in step 804 to get a value for "p0", the probability of this similarity value occurring if it were known that (n1, nm) did not match.

Finally, after getting values for "p1" and "p0", the function proceeds to step 807, where it multiplies "p1" into "prod1", and "p0" into "prod0". It then goes on to step 808, where it positions itself at the next of the split/merge evidencers, and returns to step 803.

Once step 803 indicates that all of the split/merge evidencers have been processed, the algorithm proceeds directly to step 810, where processing of split/merge evidencers to update prod1 and prod0 is terminated.

Figure 9:
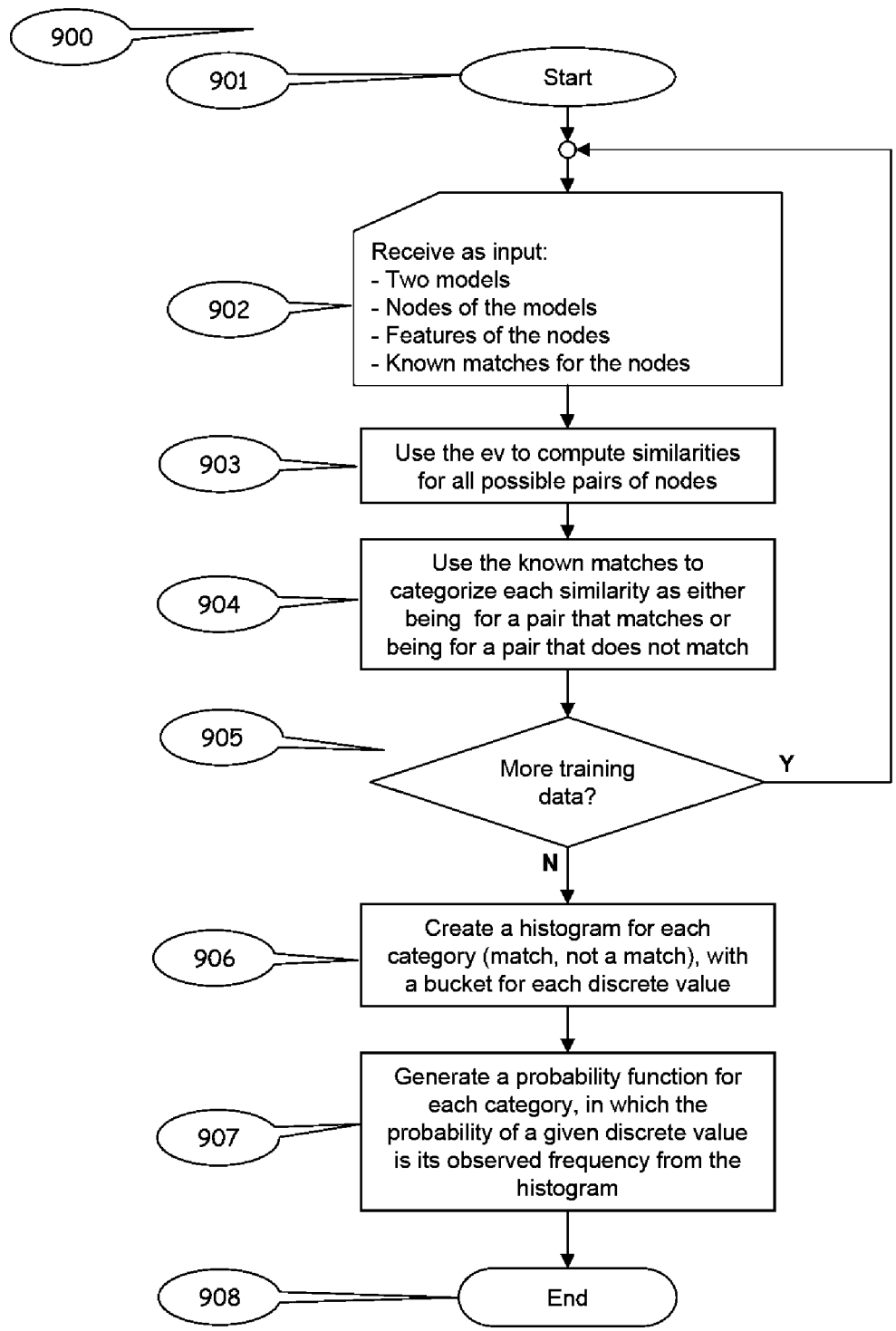
FIG. 9 is a flowchart illustrating the process of training a discrete evidencer, according to an embodiment of the present invention

FIG. 9 illustrates a flowchart for training a discrete evidencer (referred to as "ev" in FIG. 9) in accordance with the present invention. The training starts at step 901 and continues to step 902. In step 902, the training reads in as input two models, including the nodes of the models, and the features of those nodes. It also reads in the set of matches known to exist between nodes of the two models. It then proceeds to step 903, where it uses the evidencer to generate similarities for all possible node pairs between the two models. In step 904, the algorithm splits these similarity values into two categories: those for which the node pair matched, and those for which the node pair did not match.

At step 905, if there is more training data to process, the algorithm returns to step 902. If there is no more training data to process, the algorithm continues on to step 906, where it uses the accumulated categorized similarity data to create a histogram for the various discrete values within each of the above two categories. It then proceeds to step 907, where a probability function is generated for each category, in which the probability that will be given for a particular discrete value is its observed frequency from the histogram. The training terminates at step 908.

Figure 10:
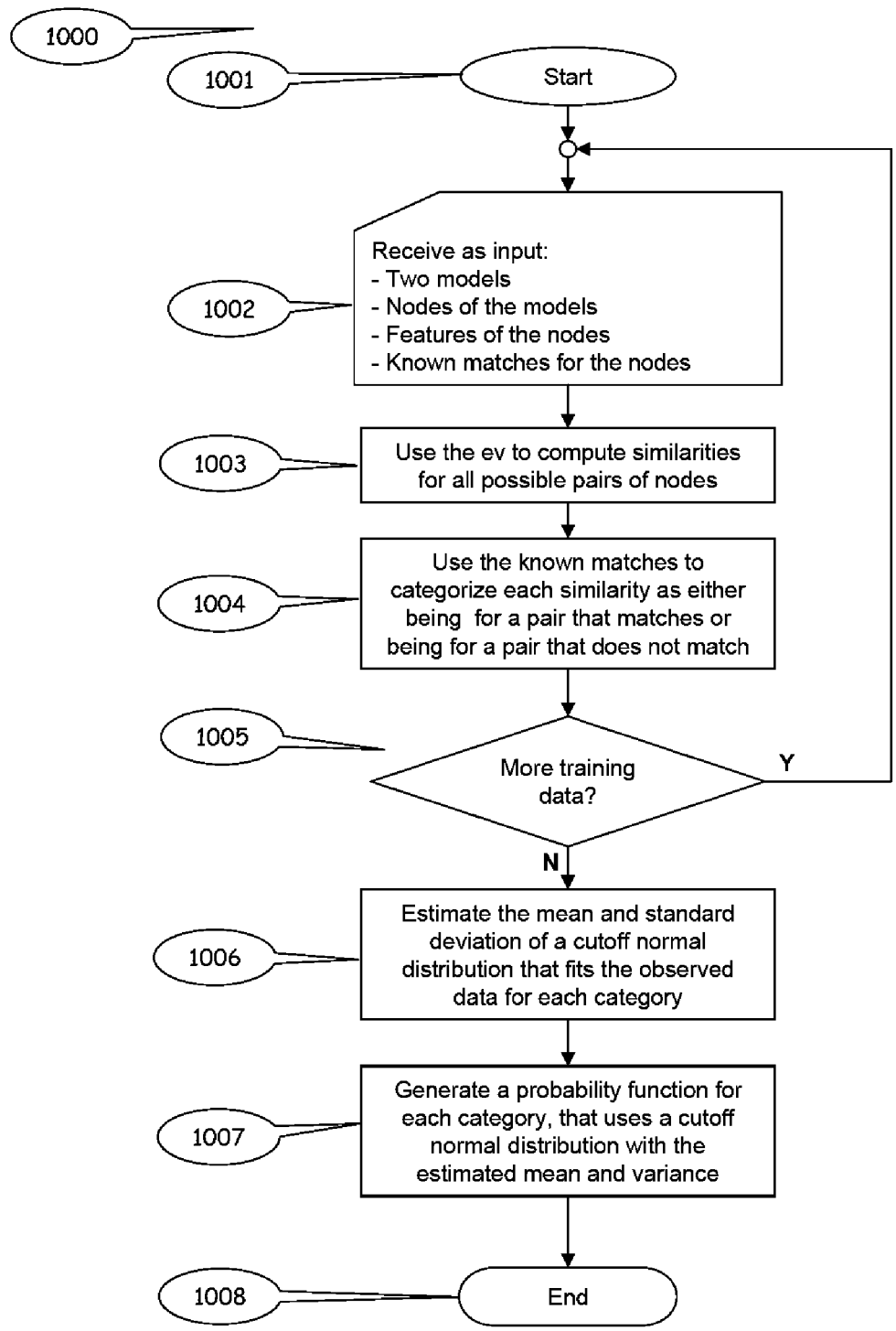
FIG. 10 is a flowchart illustrating the process of training a continuous evidencer, according to an embodiment of the present invention.

FIG. 10 illustrates a flowchart for training a continuous evidencer (referred to as "ev" in FIG. 10) in accordance with the present invention. The processing is identical to that of FIG. 9 until step 1006. At step 1006, the algorithm uses the accumulated categorized similarity data to estimate the mean and standard deviation of a cutoff normal distribution that fits the observed data for each category. The approach used in one embodiment is to use the mean and standard deviation resulting from doing a linear regression of the ordered similarity values for a given category against values from a standard normal with equal cumulative probability. At step 1007, the algorithm generates a probability function for each category that uses a cutoff normal distribution with the estimated mean and standard deviation.

Detailed Walkthrough of an Execution of the Matching Algorithm

The following is a walkthrough of the execution of the matching algorithm for the example shown in FIG. 12. Referring again to FIG. 1, at step 106, after receiving the input, the algorithm pre-computes the similarities and probabilities from all simple pair evidencers for all possible pairs of nodes that consist of one node from the first model 2001 (HLV) and one node from the second model 2002 (LLV).

Table 1 shows the similarity values from the Label Evidencer. Note that intuitively it is difficult to know what degree of label similarity makes it likely that two nodes match. One must determine if a label similarity of 0.522 is convincing, or overwhelming, or inconclusive. The same determination must be made for a label similarity of 0.348 or 0.296 or 0.083. Table 2 shows the probability values inferred by Bayesian techniques from the corresponding similarity values of Table 1. A value from Table 2 is the Bayesian "update" probability that is used to refine the Bayesian "prior" probability. A label similarity of 0.522 results in a probability of 0.494, while similarities of 0.348, 0.296, and 0.083 all result in probabilities between 0.1 and 0.2.

Intuitively, from the probability values of Table 2, it seems somewhat probable that HLV node "Data Services" 2012 matches LLV node "SQL Database Server" 2019 rather than any other LLV node, but it is not at all clear which LLV node might be the match for HLV node "Purchasing Services" 2010; therefore, other types of evidence will be required to resolve that question. Also note that a probability based on label similarity seems to suggest that "Search Services" 2011 might match "SeaLink HTTPD" 2018. In fact, that is not the correct match. "Search Services" 2011 matches "QFind Cluster" 2007, as will be discussed below in greater detail. In this case the probability value inferred from the label evidencer is in effect misleading. Below, it will be shown that probabilities based on other forms of evidence ultimately outweigh this probability. It is often the case that matches in model pairs arising out of derivation exhibit much lower degrees of label similarity than pairs arising out of revision or variation.

Table 3 shows the similarity values from the Region Evidencer, and Table 4 shows the probability values inferred from those similarity values. Similarly, Table 5 shows Position similarities and Table 6 shows probabilities inferred from those. (Because all nodes of both models in this example are of the same type, the Type Evidencer yielded a similarity of 1.0 and a probability of 0.589 for all pairs.)

Table 7 shows the probability inferred from the combination of Label, Region, Position, and Type similarities. Intuitively, for (Data Services 2012, SQL Database Server 2019), the Label-based probability of 0.494 has been reinforced by Region-based probability of 0.790 and Position-based probability of 0.818. With all evidence pointing to this pair being a match, in fact this is the most likely match found by the search algorithm, as will be discussed below in greater detail. For "Purchasing Services" 2010, the choice is now clear: it matches "SeaLink HTTPD" 2018. And for "Search Services" 2011, all of the other kinds of evidence have outweighed the initial Label-based probability ("SeaLink HTTPD" 2018), and "QFind Cluster" 2007 is now a clear choice.

Tables 8, 9, and 10 show probabilities that factor in Local Connection evidence, just for completeness sake. As was discussed above, these probabilities are in fact not pre-computed, because the Local Connection Evidencer relies on the state of the partial mapping at the time that the Local Connection-based evidence is being considered. These tables show probabilities in which Local Connection similarities are in fact based on the final mapping.

Finally, Table 11 shows similarity and probability values from pair evidencers and split evidencers for the 1:3 split (Client 2009, [EarthWind Firewall 2021, FireFox TC 2017, Mapplet RCP 2016]). As will be discussed in greater detail below, this split is in fact chosen by the search algorithm as a match. This choice would appear to be reinforced by the strength of evidence concerning position of nodes, and "internal" connectivity among the nodes on the "n side" of the 1:n split i.e. the nodes on the LLV side of the split. Note that in this case a human expert would deem (Client 2009, [FireFox TC 2017, Mapplet RCP 2016]) to be a 1:2 split, and would deem EarthWind Firewall 2021 to be a new unmatched node in the LLV 2002. But that would be based on semantics—an understanding of the domain of IT architecture and the meaning of terms like "firewall"—evidence which is currently beyond the matching algorithm.

TABLE 1

Label similarity values.

|  | Earth-Wind Firewall | FireFox TC | Mapplet RCP | QFind Cluster | SQL Database Server | SeaLink HTTPD |
|---|---|---|---|---|---|---|
| Client | 0.083 | 0.125 | 0.118 | 0.316 | 0.095 | 0.211 |
| Purchasing Services | 0.313 | 0.167 | 0.080 | 0.296 | 0.276 | 0.296 |
| Search Services | 0.286 | 0.200 | 0.190 | 0.174 | 0.320 | 0.348 |
| Data Services | 0.231 | 0.111 | 0.316 | 0.095 | 0.522 | 0.095 |

TABLE 2

Pairwise match probabilities inferred from Label similarity

|  | Earth-Wind Firewall | FireFox TC | Mapplet RCP | QFind Cluster | SQL Database Server | SeaLink HTTPD |
|---|---|---|---|---|---|---|
| Client | 0.137 | 0.129 | 0.130 | 0.171 | 0.134 | 0.131 |
| Purchasing Services | 0.169 | 0.127 | 0.137 | 0.160 | 0.150 | 0.160 |
| Search Services | 0.154 | 0.129 | 0.128 | 0.127 | 0.174 | 0.195 |
| Data Services | 0.135 | 0.131 | 0.171 | 0.134 | 0.494 | 0.134 |

TABLE 3

Region similarity values.

|  | Earth-Wind Firewall | FireFox TC | Mapplet RCP | QFind Cluster | SQL Database Server | SeaLink HTTPD |
|---|---|---|---|---|---|---|
| Client | NEAR | SAME | SAME | NEAR | FAR | NEAR |
| Purchasing Services | SAME | NEAR | NEAR | SAME | NEAR | SAME |
| Search Services | SAME | NEAR | NEAR | SAME | NEAR | SAME |
| Data Services | NEAR | FAR | FAR | NEAR | SAME | NEAR |

TABLE 4

Pairwise match probabilities inferred from Region similarity

|  | Earth-Wind Firewall | FireFox TC | Mapplet RCP | QFind Cluster | SQL Database Server | SeaLink HTTPD |
|---|---|---|---|---|---|---|
| Client | 0.104 | 0.790 | 0.790 | 0.104 | 0.009 | 0.104 |
| Purchasing Services | 0.790 | 0.104 | 0.104 | 0.790 | 0.104 | 0.790 |
| Search Services | 0.790 | 0.104 | 0.104 | 0.790 | 0.104 | 0.790 |
| Data Services | 0.104 | 0.009 | 0.009 | 0.104 | 0.790 | 0.104 |

TABLE 5

Position similarity values

|  | Earth-Wind Firewall | FireFox TC | Mapplet RCP | QFind Cluster | SQL Database Server | SeaLink HTTPD |
|---|---|---|---|---|---|---|
| Client | 0.802 | 0.809 | 0.712 | 0.431 | 0.163 | 0.366 |
| Purchasing Services | 0.611 | 0.271 | 0.616 | 0.276 | 0.642 | 0.829 |
| Search Services | 0.595 | 0.645 | 0.352 | 0.843 | 0.207 | 0.341 |
| Data Services | 0.395 | 0.091 | 0.287 | 0.330 | 0.932 | 0.799 |

TABLE 6

Pairwise match probabilities inferred from Position similarity

|  | Earth-Wind Firewall | FireFox TC | Mapplet RCP | QFind Cluster | SQL Database Server | SeaLink HTTPD |
|---|---|---|---|---|---|---|
| Client | 0.607 | 0.620 | 0.444 | 0.126 | 0.045 | 0.095 |
| Purchasing Services | 0.288 | 0.065 | 0.293 | 0.066 | 0.330 | 0.657 |
| Search Services | 0.267 | 0.334 | 0.089 | 0.681 | 0.052 | 0.085 |
| Data Services | 0.107 | 0.037 | 0.069 | 0.082 | 0.818 | 0.603 |

TABLE 7

Pairwise match probabilities inferred from the combination of Label, Region, Position, and Type similarities (but not Local Connection similarity)

|  | Earth-Wind Firewall | FireFox TC | Mapplet RCP | QFind Cluster | SQL Database Server | SeaLink HTTPD |
|---|---|---|---|---|---|---|
| Client | 0.039 | 0.565 | 0.391 | 0.005 | 0.000 | 0.003 |
| Purchasing Services | 0.307 | 0.002 | 0.011 | 0.067 | 0.014 | 0.662 |
| Search Services | 0.264 | 0.012 | 0.002 | 0.626 | 0.002 | 0.109 |
| Data Services | 0.003 | 0.000 | 0.000 | 0.002 | 0.960 | 0.037 |

TABLE 8

Local Connection similarity values based on final mapping

|  | Earth-Wind Firewall | FireFox TC | Mapplet RCP | QFind Cluster | SQL Database Server | SeaLink HTTPD |
|---|---|---|---|---|---|---|
| Client | 1.0 | 0.0 | 0.0 | 0.0 | −1.0 | 0.0 |
| Purchasing Services | 0.0 | 0.0 | 0.0 | 0.0 | −1.0 | 1.0 |
| Search Services | 0.0 | −1.0 | −1.0 | 1.0 | −1.0 | 0.0 |
| Data Services | −1.0 | −1.0 | −1.0 | −1.0 | 1.0 | −1.0 |

TABLE 9

Pairwise match probabilities inferred from Local Connection similarity based on final mapping

|  | Earth-Wind Firewall | FireFox TC | Mapplet RCP | QFind Cluster | SQL Database Server | SeaLink HTTPD |
|---|---|---|---|---|---|---|
| Client | 0.9310 | 0.3241 | 0.3241 | 0.3241 | 0.6325 | 0.3241 |
| Purchasing Services | 0.3241 | 0.3241 | 0.3241 | 0.3241 | 0.6325 | 0.9310 |
| Search Services | 0.3241 | 0.6325 | 0.6325 | 0.9310 | 0.6325 | 0.3241 |
| Data Services | 0.6325 | 0.6325 | 0.6325 | 0.6325 | 0.9310 | 0.6325 |

TABLE 10

Pairwise match probabilities inferred from the combination of all evidencer similarities

|  | Earth-Wind Firewall | FireFox TC | Mapplet RCP | QFind Cluster | SQL Database Server | SeaLink HTTPD |
|---|---|---|---|---|---|---|
| Client | 0.09851 | 0.11095 | 0.05790 | 0.00047 | 3.2e−5 | 0.00025 |
| Purchasing Services | 0.04072 | 0.00016 | 0.00105 | 0.00689 | 0.00493 | 0.84098 |
| Search Services | 0.03328 | 0.00423 | 0.00082 | 0.81864 | 0.00066 | 0.01155 |
| Data Services | 0.00106 | 2.6e−5 | 6.8e−5 | 0.00078 | 0.98460 | 0.01319 |

TABLE 11

Similarities and probabilities from pair evidencers and split evidencers for 1:3 split (Client 2009, [EarthWind Firewall 2021, FireFox TC 2017, Mapplet RCP 2016])

| Evidencer | (Minimum) Similarity | (Normalized) Probability |
|---|---|---|
| Label | 0.08333 | 0.13653 |
| Region | 0.5 | 0.10364 |
| Position | 0.71237 | 0.44393 |
| Type | 1.0 | 0.58894 |
| LabelSim | 0.20690 | 0.38023 |
| LabelIntersect | 0.0 | 0.47721 |
| LabelConcat | 0.0 | 0.47872 |
| Connect | TRUE | 0.8 |
| Contain | 0.0 | 0.47872 |

Continuing with the flow chart of FIG. 1, at step 103, the algorithm continues with the search for a mapping.

Referring again to FIG. 2, and FIG. 3, in our example, the first pair to be considered for the mapping, just by chance, was (Client 2009, EarthWind Firewall 2021), which produced a pair probability of 0.014. Since there were no other pairs in the mapping yet, this constituted the probability for the entire mapping as well. This was high enough to exceed the probability of the previous mapping (which had been initialized to 1.0 and multiplied by P_DROP which was 0.01), and so the pair was saved as the best pair so far that had been added to the mapping.

The next pair to be considered was (Client 2009, FireFox TC 2017), which produced a probability of 0.309. Since this value was higher than the 0.014 which was obtained using (Client 2009, Earthwind Firewall 2021), (Client 2009, FireFox TC 2017) replaced (Client 2009, EarthWind Firewall 2021) as the best pair so far to be added to the mapping, and the search continued to see if there was an even better pair to add. Eventually the best pair found was (Data Services 2012, SQL Database Server 2019), with a probability of 0.891. Since the pair (Data Services 2012, SQL Database Server 2019) was the pair that yielded the highest mapping probability, it was permanently added to the mapping, as reflected in the following program output:

```
Data Services         < - >    SQL Database Server      0.8908
~~~~ Mapping: 0.8908
```

The search then started over, searching for a second pair to add to the mapping. Again, the first pair which was considered was (Client 2009, EarthWind Firewall 2021), which again yielded a pair probability of 0.014. This was multiplied by the pair probability of the pair that was already in the mapping, (Data Services 2012, SQL Database Server 2019), to yield a mapping probability of 0.0123. As this was higher than 0.01*0.8908 (P_DROP*previous mapping probability), the (Client 2009, EarthWind Firewall 2021) pair was saved as the best pair so far to be added to the mapping. The search continued to consider other pairs in this manner until it came to (Purchasing Services 2010, SeaLink HTTPD 2018), which produced a probability of 0.841, which when multiplied by the 0.9846 of (Data Services 2012, SQL Database Server 2019), yielded a mapping probability of 0.8280. Since this value was higher than the best solution so far, this pair was saved.

No pair could be found other than (Purchasing Services 2010, SeaLink HTTPD 2018) that gave a higher probability for the mapping, so that pair was chosen as the second pair for the mapping. The following program output shows the pair probabilities for the matches (Data Services 2012, SQL Database Server 2019) and (Purchasing Services 2010, SeaLink HTTPD 2018), and the probability of the mapping:

| | | | |
|---|---|---|---|
| Data Services | < - > | SQL Database Server | 0.9846 |
| Purchasing Services | < - > | SeaLink HTTPD | 0.8410 |
| Mapping: 0.8280 | | | |

Note that the pair probability of (Data Services 2012, SQL Database Server 2019) improved from the 0.8908 shown previously to the 0.9846 shown now. This improvement can be attributed to the Local Connection Evidencer, which gauges similarity based on neighbors. In this case, Data Services 2012 is connected to Purchasing Services 2010, and SQL Database Server 2019 is connected to SeaLink HTTPD 2018. Since the mapping now includes a match between Purchasing Services 2010 and SeaLink HTTPD 2018, the neighbors of Data Services 2012 and SQL Database Server 2019 now match, which is taken as evidence that (Data Services 2012, SQL Database Server 2019) is more likely to be a match. It should also be noted that, as discussed previously, Local Connection Evidencer probabilities are recomputed each time the mapping changes.

The search continued as described above, adding a third and a fourth node pair, as indicated in the following program output:

| | | | |
|---|---|---|---|
| Data Services | < - > | SQL Database Server | 0.9846 |
| Purchasing Services | < - > | SeaLink HTTPD | 0.8410 |
| Search Services | < - > | QFind Cluster | 0.8186 |
| Client | < - > | EarthWind Firewall | 0.0985 |
| Mapping: 0.0668 | | | |

The last note of interest is what happens when the search attempts to match the Client node 2009. As can be seen in the program output above, matching Client node 2009 with EarthWind Firewall 2021 now results in an overall pair probability of 0.0985 (a large increase, due to the Local Connection Evidencer, from the 0.014 seen earlier), resulting in a mapping probability of 0.0668. After adding that pair to the mapping, the search then looks at the set of candidate pairs again for another pair to add. Recall that it now would be comparing any resulting mapping probability against the existing mapping probability multiplied by P_DROP. In this case, it would be comparing against 0.0668*0.01=0.00067. When it encounters (Client 2009, FireFox TC 2017), it adds it to the mapping as a candidate, which results in a split: (Client 2009, [EarthWind Firewall 2021, FireFox TC 2017]).

It evaluates this split, getting a split probability of 0.0013. It then reevaluates the other pairs in the mapping, and recomputes the mapping probability, resulting in a mapping probability of 0.00088, which is indeed higher than 0.00067. Thus the (Client 2009, FireFox TC 2017) pair was kept as the best pair so far to be added to the mapping next. The search for a better pair continued, but no pair was found which would yield a higher mapping probability, so the (Client 2009, FireFox TC 2017) pair was kept as part of the mapping. This is shown in the following program output.

| | | | |
|---|---|---|---|
| Data Services | < - > | SQL Database Server | 0.9846 |
| Purchasing Services | < - > | SeaLink HTTPD | 0.8410 |
| Search Services | < - > | QFind Cluster | 0.8186 |
| Client | < - > | EarthWind Firewall | 0.0013 |
| | < - > | FireFox TC | |
| Mapping: 0.00088 | | | |

Similarly, in the next iteration of the search, a third match was found for Client 2009, as Mapplet RCP 2016 was added to the split. The resulting mapping probability of 0.0004999 was higher than the previous value of 0.00088*0.01, and so the new pair was kept as the best pair so far to be added to the mapping. The search continued to consider all other pairs, but found no better pair, and so the pair (Client 2009, Mapplet RCP 2016) was added in, resulting in a 1:3 split. The resulting mapping probability was 0.000339, as shown in the program output below.

| | | | |
|---|---|---|---|
| Data Services | < - > | SQL Database Server | 0.9846 |
| Purchasing Services | < - > | SeaLink HTTPD | 0.8410 |
| Search Services | < - > | QFind Cluster | 0.8186 |
| Client | < - > | EarthWind Firewall | 0.0005 |
| | < - > | FireFox TC | |
| | < - > | Mapplet RCP | |
| Mapping: 0.000339 | | | |

At this point, all of the nodes on both sides have been matched, and the search is terminated, resulting in a mapping with the final probability of 0.000339.

Detailed Walkthrough of an Execution of the Training Algorithm

The following is a walkthrough of training one of the probability distribution functions for a continuous evidencer—the Label Evidencer. Ultimately, based on similarities observed in the training data, we want to generate a function "getProbabilityGivenMatch(sim)" that returns the probability of the similarity "sim" occurring, were it known that the pair of nodes matches.

The form of distribution selected by this embodiment for the continuous case is: cutoff normal distribution with unit interval range, with the distribution being characterized by two parameters: mean "mu," and standard deviation "sigma."

To be practical for discussion, this example uses a highly unrealistically small set of training data—a single pair of small models: the pair of models of FIG. 12. Clearly, in actual practice, a much larger set of training data would generally be required.

Referring again to FIG. 10, at step 1003 the algorithm invokes the Label Evidencer similarity function against all possible pairs of nodes that consist of one node from the first model and one node from the second model. The resulting similarities are shown in Table 1.

At step 1006 the algorithm computes a mean and standard deviation as follows. The similarity values of the pairs that are known to be matches are selected and ordered (the known matches are in fact those shown above at the end of the walkthrough of the execution of the matching algorithm). The resulting sequence of similarity values is: 0.083, 0.118, 0.125, 0.174, 0.296, 0.522. A corresponding sequence of values from the Percent Point Function of a standard normal with equal cumulative probability, is then generated by evaluating the percent-point function against a set of probability values equally spaced between 0 and 1: $1/(N+1), 2/(N+1), \ldots N/(N+1)$, in this case: $1/7, 2/7, \ldots 6/7$, which is: 0.14, 0.29, 0.43, 0.57, 0.71, and 0.86, resulting in the sequence of values:

−1.07, −0.57, −0.18, 0.18, 0.56, 1.06. Treating that sequence as x-coordinates of N points, and the sequence of similarity values as y-coordinates of the N points, a linear regression is performed, resulting in a slope of 0.19 and an intercept of 0.22. The intercept constitutes the estimate of the mean of the cutoff normal distribution that fits the observed data, and the slope constitutes the estimate of the standard deviation of the distribution.

At step 1007, the algorithm generates a probability distribution function that is essentially the normal probability density function with the given mean and standard deviation:

```
def getProbabilityGivenMatch(sim):
    mu, sigma = 0.22, 0.19
    return cutnorm(sim, mu, sigma)
def cutnorm(sim, mu, sigma):
    if sim == 0.0:
        return stats.norm.cdf(sim, mu, sigma)
    elif sim == 1.0:
        return 1 - stats.norm.cdf(sim, mu, sigma)
    else:
        return stats.norm.pdf(sim, mu, sigma)
``` where "stats.norm.cdf" is the Cumulative Distribution Function of a Normal Distribution and "stats.norm.pdf" is the Probability Density Function of a Normal Distribution. That function would become the "getProbabilityGivenMatch (sim)" similarity function of the Label Evidencer.

Other Embodiment

According to another embodiment of the invention, a computer readable medium, such as a CDROM can include program instructions for operating the programmable computer 1100 according to the invention. The method can also be implemented as machine executable instructions executed by a programmable information processing system or as hard coded logic in a specialized computing apparatus such as an application-specific integrated circuit (ASIC).

We have designed a framework that can support and combine many kinds of reasoning used in finding model correspondences in a disciplined, quantitative fashion; and we have implemented a matching correspondence algorithm.

While the invention has been described in terms of one or more exemplary embodiments, those skilled in the art will recognize that the invention can be practiced with modification within the spirit and scope of the appended claims.

We claim:

1. A method for determining a mapping between a first artifact and a second artifact, each artifact comprising at least one constituent, each at least one constituent comprising at least one feature, wherein each at least one feature is selected from a feature group consisting of: a relationship feature and a characteristic feature, the mapping comprising at least one constituent match comprising a correspondence between at least one constituent of the first artifact and at least one constituent of the second artifact, the method comprising steps of:
   using an input/output interface,
   a) receiving as input the first and second artifacts, and a description of the first and second artifacts, constituents, and the features of the constituents; and
   using a processor device performing steps of:
   b) performing advanced inexact matching, comprising steps of selecting the mapping, the mapping comprising the at least one constituent match; using search algorithms for formulating a candidate solution, wherein a space of possible solutions comprises a space of all possible mappings, wherein a value of the candidate solution is a probability of a candidate mapping, and wherein the probability of the candidate mapping is a product of an individual probability of correspondence of constituent matches it comprises; and determining a correspondence probability of the at least one constituent match by Bayesian inference over a joint probability distribution concerning a number of types of evidence; and
   c) producing as output the mapping determined from the step of performing advanced inexact matching.

2. The method of claim 1, wherein the at least one constituent match comprises a correspondence between one constituent of the first artifact and a plurality of constituents of the second artifact.

3. The method of claim 1, wherein the step of performing advanced inexact matching further comprises: selecting the at least one constituent match based on a correspondence probability of the at least one constituent match.

4. The method of claim 1, wherein the step of performing advanced inexact matching further comprises:
   selecting the at least one constituent match based on multiple types of evidence.

5. The method of claim 1, wherein the step of performing advanced inexact matching further comprises:
   selecting the at least one constituent match that results in a better mapping by comparing a value of said mapping with a value of another mapping, wherein the better mapping is defined as the mapping yielding a higher mapping probability, wherein the mapping probability is a product of an individual probability of correspondence of constituent matches it comprises.

6. The method of claim 1 further comprising performing a greedy search, wherein the greedy search comprises steps of:
   starting with a current mapping wherein the current mapping is initially empty;
   progressively building the current mapping by adding each unused set of constituents in turn to the current mapping for producing a new mapping, wherein the unused set of constituents comprises the at least one constituent from the first artifact and the at least one constituent from the second artifact, wherein the constituents may not already share a correspondence;
   evaluating the new mapping; and
   selecting the new mapping with a highest mapping probability.

7. The method of claim 6 further comprising a step of:
   terminating the step of progressively building the current mapping when a mapping probability can no longer be improved, wherein the mapping probability is improved when the new mapping is greater than a product of the current mapping and a probability of omitting a constituent from the new mapping.

8. The method of claim 6, wherein the step of progressively building further comprises steps of:
   forming all possible combinations of unused sets; and
   adding each possible combination of unused sets in turn to the new mapping.

9. The method of claim 1, wherein a type of evidence is a similarity measure.

10. The method of claim 9, wherein the joint probability distribution relates to a heuristic determination of the similarity measure selected from a group consisting of: minimum of similarities, maximum of similarities, and average of similarities, wherein each similarity measure is measured between a single constituent on one side of a split/merge match, and one of multiple constituents on an other side of a split/merge match.

11. The method of claim 9 further comprising determining a feature similarity probability distribution by a step of analyzing feature similarities in training data, wherein the analyzing step comprises:
performing training runs on sample matches and sample non-matches to determine individual feature probability distributions based on evidencers, wherein the step of performing training runs comprises steps of:
selecting a plurality of known matches;
determining a similarity of a feature among the known matches;
determining an individual probability function for a probability of finding said similarity among the known matches;
selecting a plurality of known non-matches;
determining a similarity of a feature among the known non-matches; and
determining an individual probability function for a probability of finding said similarity among the known non-matches.

12. The method of claim 11, wherein a type of evidence exhibits conditional independence and each similarity probability distribution is determined independently of any other feature similarity probability distribution.

13. The method of claim 11 further comprising a step of:
overriding the determined individual probability function responsive to manual adjustment.

14. The method of claim 1, wherein the joint probability distribution relates to a heuristic combination of a feature value from each of a plurality of constituents of a split/merge match.

15. The method of claim 14, wherein the joint probability distribution relates to at least one evidencer selected from a group consisting of: Label, Type, Region, Position, Connect, Contain, LabelSim, LabelIntersect, and LabelConcat evidencers.

16. The method of claim 1, wherein the probability of the candidate mapping is overridden by manual specification.

17. A system for determining a mapping between a first artifact and a second artifact, the system comprising:
an input/output interface configured for receiving the first and second artifacts as input data and transmitting the mapping as output data;
data storage configured for storing the first and second artifacts, and a description of the first and second artifacts, constituents, and features of the constituents, wherein each artifact comprising at least one constituent, each at least one constituent comprising at least one feature, wherein each at least one feature is selected from a feature group consisting of: a relationship feature and a characteristic feature; and
a processor configured to execute instructions to:
perform advanced inexact matching, comprising steps of selecting the mapping, the mapping comprising at least one constituent match, the at least one constituent match comprising a correspondence between the at least one constituent of the first artifact and the at least one constituent of the second artifact; using search algorithms for formulating a candidate solution, wherein a space of possible solutions comprises a space of all possible mappings, wherein a value of the candidate solution is a probability of a candidate mapping, and wherein the probability of the candidate mapping is a product of an individual probability of correspondence of constituent matches it comprises; and determining a correspondence probability of the at least one constituent match by Bayesian inference over a joint probability distribution concerning a number of types of evidence; and
produce as output the mapping determined from the step of performing advanced inexact matching.

18. A computer program product embodied on a computer readable medium and comprising code that, when executed, causes a computer to perform the following steps:
receive as input a first artifact and a second artifact, and a description of the first and second artifacts, constituents, and features of the constituents, wherein each artifact comprising at least one constituent, each at least one constituent comprising at least one feature, wherein each at least one feature is selected from a feature group consisting of: a relationship feature and a characteristic feature;
perform advanced inexact matching, comprising steps of selecting a mapping between a first artifact and a second artifact, the mapping comprising at least one constituent match, the at least one constituent match comprising a correspondence between the at least one constituent of the first artifact and the at least one constituent of the second artifact; using search algorithms for formulating a candidate solution, wherein a space of possible solutions comprises a space of all possible mappings, wherein a value of the candidate solution is a probability of a candidate mapping, and wherein the probability of the candidate mapping is a product of an individual probability of correspondence of constituent matches it comprises; and determining a correspondence probability of the at least one constituent match by Bayesian inference over a joint probability distribution concerning a number of types of evidence; and
produce as output the mapping determined from the step of performing advanced inexact matching.

* * * * *